US006477434B1

(12) United States Patent
Wewalaarachchi et al.

(10) Patent No.: US 6,477,434 B1
(45) Date of Patent: *Nov. 5, 2002

(54) METHOD AND APPARATUS FOR THE CREATION OF PERSONALIZED SUPERVISORY AND CONTROL DATA ACQUISITION SYSTEMS FOR THE MANAGEMENT AND INTEGRATION OF REAL-TIME ENTERPRISE-WIDE APPLICATIONS AND SYSTEMS

(76) Inventors: Bandu Wewalaarachchi, 139, Haig Road, #02-04, Singapore 438768 (SG); Aruna Sanjaya Gunasiri, 112 F, Holland Mansion, Holland Road, Singapore 278555 (SG); Priyantha Gunasekera, 241, Bukit Butok, East Avenue 5, #06-285, Singapore 650241 (SG); Haritharan Gunasingham, 522 East Coast Road, #06-01, Nasuas Block, Singapore 458966 (SG)

( * ) Notice: Subject to any disclaimer, the term of this patent is extended or adjusted under 35 U.S.C. 154(b) by 0 days.

This patent is subject to a terminal disclaimer.

(21) Appl. No.: 09/526,981

(22) Filed: Mar. 15, 2000

Related U.S. Application Data

(63) Continuation of application No. 09/007,438, filed on Jan. 15, 1998, now Pat. No. 6,067,477.

(51) Int. Cl.[7] .............................................. G06F 15/00
(52) U.S. Cl. ........................................... 700/83; 700/17
(58) Field of Search ................................ 700/13, 3, 67, 700/17, 9; 707/103; 709/223, 224, 249, 202; 345/349, 249

(56) References Cited

U.S. PATENT DOCUMENTS 4,228,123 A * 10/1980 Heckel ........................ 345/334

4,570,217 A    2/1986 Allen et al. ................... 700/83

(List continued on next page.)

OTHER PUBLICATIONS

Genesereth, M.R. and Ketchpel, S.P., "Software Agents", *Communications of the ACM*, vol. 37, No. 7, pp. 48–53, Jul. 1994.

(List continued on next page.)

*Primary Examiner*—Leo Picard
*Assistant Examiner*—Kidesi Bahta

(57) ABSTRACT

A system and method provide for the creation and operation of real-time, enterprise-wide, personalized supervisory and control data acquisition systems Personalized SCADA applications are constructed from a virtual application service arid a personal agent framework using simple drag and drop operations or other high level actions. The virtual application service includes a communications gateway that communicates with disparate arid non-interoperable systems and external field devices to communicate low level real time data collected from such systems into the application environment, transforming the collected data in a single common data format. The virtual application service includes application cells that receive the reformatted data and process it to provide high level analysis and context, storing the processed data in an object server. The object server provides a unified, hierarchical object model for all of the data received from the underlying devices and systems. The virtual application service communicates with personal agent frameworks containing presentation cells arid service agents. The service agents arc representative of the virtual application service, and provide the personal agent framework with access to the object server to receive and send data from the object server to the Presentation cells. The presentation cells subscribe to the abject server's data objects via the service agent. Presentation cells provide a graphical representation and mapping of data objects and hence underlying devices and systems, to allow a uses to manage and control such systems.

12 Claims, 16 Drawing Sheets

U.S. PATENT DOCUMENTS

| | | | |
|---|---|---|---|
| 4,635,183 A | * 1/1987 | Isobe et al. | 700/83 |
| 4,644,478 A | * 2/1987 | Stephens et al. | 700/83 |
| 4,991,076 A | 2/1991 | Zifferer et al. | 700/87 |
| 5,398,336 A | 3/1995 | Tantry et al. | 707/103 |
| 5,568,402 A | 10/1996 | Gray et al. | 709/224 |
| 5,576,946 A | 11/1996 | Bender et al. | 345/500.39 |
| 5,583,793 A | 12/1996 | Gray et al. | 700/223 |
| 5,604,892 A | 2/1997 | Nuttall et al. | 700/17 |
| 5,825,361 A | 10/1998 | Rubin et al. | 345/349 |

OTHER PUBLICATIONS

Greif, I., "Desktop Agents in Group–Enabled Products", *Communications of the ACM*, vol. 37, No. 7, pp. 100–105, Jul. 1994.

Maffeis, S. and Schmidt, D.C., "Constructing Reliable Distributed Communication Systems with CORBA", *IEEE Communications Magazine*, pp. 56–60, Feb. 1997.

Schmidt, D.C., Gokhale, A.S., Harrison, T.H. and Parulkar, G., "A High–Performance End System Architecture for Real–Time CORBA", *IEEE Communications Magazine*, pp. 72–77, Feb. 1997.

Selic, B., Gullekson, G. and Ward, P.T., *Real–Time Object-Oriented Modeling*, Chapters 1,2, 10, and 11, John Wiley & Sons, Inc., 1994.

\* cited by examiner

| PERSONAL AGENT FRAMEWORK 208 | PERSONAL AGENT | 300 |
|---|---|---|
| | PRESENTATION CELLS | 302 |
| | SERVICE AGENTS | 304 |
| VIRTUAL APPLICATION SERVICE 200 | OBJECT SERVER & DATA OBJECTS | 206 |
| | APPLICATION CELLS | 204 |
| | COMMUNICATIONS GATEWAY | 202 |

| | DEVICE NETWORK | | | 216 |
|---|---|---|---|---|
| | 218 FIELD DEVICE | 218 FIELD DEVICE | 220 CONTROL APPLICATION | 220 CONTROL APPLICATION |

*FIG. 2*

METHOD AND APPARATUS FOR THE CREATION OF PERSONALIZED SUPERVISORY AND CONTROL DATA ACQUISITION SYSTEMS FOR THE MANAGEMENT AND INTEGRATION OF REAL-TIME ENTERPRISE-WIDE APPLICATIONS AND SYSTEMS

RELATED APPLICATIONS

This application is a continuation of U.S. application Ser. No. 09/007,438, filed on Jan. 15, 1998, now U.S. Pat. No. 6,067,477 entitled "Method and Apparatus for the Creation of Personalized Supervisory and Control Data Acquisition Systems for the Management and Integration of Real-Time Enterprise-Wide Applications and Systems" which is incorporated by reference herein in its entirety.

BACKGROUND

1. Field of the Invention

The present invention relates to computer implemented supervisory control and data acquisition systems (SCADA), and more particularly, to SCADA systems providing for personalized, distributed, portable real time control and data acquisition environments capable of integrating with existing legacy applications.

BACKGROUND OF THE INVENTION

Real Time Systems

Real-time systems are necessary where there is a need to guarantee real-time response to achieve a required quality of service of various underlying devices, communications networks, operating systems, middleware components and application components. Thus, real-time systems are widely applied to diverse applications domains such as manufacturing, facilities management, power systems management, financial analysis systems, and telecommunications.

By definition, a real-time system provides a result in response to an event in a time scale that is adequate to meet the quality of service and performance needs of the application. Certain situations can be time critical in which case they require a hard real-time system, in other words, a hardware based system providing for hardware level integration of the various levels of control, monitoring, and communications systems. For a hard real-time system, the validity of the returned results depends on its correctness as well as its timeliness.

The complexity of real-time systems arises from the need to respond to concurrent events occurring within a single application (or within multiple applications) at the same time. Also, a real-time system must provide some way of managing configuration management, fault management, static and dynamic scheduling, and fault tolerance. However, some applications may be hard real-time applications and others soft real-time applications. This results in increased complexity in managing and correlating data and information generated by the different systems into a single coherent system model.

In addition, there is a need to guarantee end-to-end quality of service to every application, regardless of its implementation, communications protocols, or other integration factors.

Object-oriented systems provide a way of creating integrated, non-hierarchical real-time enterprise systems. However, object-oriented systems are often limited for practicality to modeling a small number of relatively independent object types interacting in well defined ways. The design of large-scale applications having many hundreds of different type objects is a complex undertaking.

A common strategy for implementing a real-time system is through a hierarchical architecture, where the system is separated into control, supervisory and management layers. The control layer is generally hard real-time in nature, whereas the supervisory and management layers may have decreasing needs for strict guarantee of time, and in many cases are implemented in software.

Supervisory Control and Data Acquisition (SCADA) is an example of the hierarchical real-time computer architecture such as described above. SCADA has been widely used since the early 1960's in areas such as process control and power systems management. FIG. 1 shows a typical software structure of a SCADA System.

SCADA systems are increasingly being implemented using the client-server model, in which the centralized database stores real time data and acts as a server to graphical user interface clients. Information is transferred from the control network to the real-time database through an input/output server.

In conventional SCADA systems, the real time data is captured from external sensors, control devices, or applications, and is logged to a centralized database. In response, controls on workstations are executed to manage the remote devices. All actions are performed from a centralized location. Basic control functions include alarm, trend, scan, and status operations.

One problem with conventional SCADA systems is that they are completely centralized. In a client-server system, all of the remote data information is loaded up into the central database, and then remote clients access the system. A problem with this design is degraded performance due to the single point of access, as many remote clients attempt to access the real time data through the single database server. This conventional design thus induces a scalability problem which limits the number of concurrent users.

One solution then is to use multiple real time databases, which partition the data being gathered according to geographic, management, or functional criteria. The problem here is configuration management. Traditionally, configuration is done by mapping input and output points to the database fields. If there are multiple databases, then the system designer has to change the mapping of the remote sensors to the databases, and maintain these mappings over a large number of remote devices and databases. Changes in partitioning of data induce further configuration maintenance. In addition, multiple, partitioned databases make it very difficult to introduce new types of data into the database configuration, and provide for new mappings.

In a traditional SCADA systems, the application components which manage the underlying control devices is not integrated with other legacy or enterprise applications. For example, a card access system is a typical SCADA system that would be used in a business to monitor and track employee building access; separately, the business may have human resource and payroll applications that are supported as enterprise systems, and which would desirably use the data generated by the card access system. However, conventional SCADA systems do not typically provide this direct integration path because the data that comes from the SCADA system's control network is either in digital IO or analogue form and so not directly readable by the types of entities in the enterprise application, which generally operate with higher level data types. In other words, the data in the SCADA system is very low level, and the interpretation of such data is at a high level in the management layer. In an enterprise system by contrast, the data entities themselves are already at a higher level of abstraction, and the application's functional components are not suited to process low level digital or analogue data from the SCADA system. Where the enterprise system is object-oriented, there is a further need to integrate the enterprise system into the SCADA applications which may not in themselves be object-oriented. Integration of non-object oriented applications into an object-oriented system becomes a particular problem when dealing with real-time applications.

Finally, in a conventional SCADA system, there is integration of a large number of control devices through a number of diverse control networks. For example, there may be a security, a fire alarm, heating, cooling, electrical, and elevator control systems. Each of these network may have a different protocol for describing and managing data produced by underlying control devices, and thus are not designed inter-operate with each other. Data which is generated by one application cannot be understood or processed by another application. This makes it difficult to integrate the storage and processing of data into a single, logical model of the enterprise or facility. Accordingly, there is typically a different gateway for each network that interfaces with these control networks and translates from the different protocols into a single database.

SUMMARY OF THE INVENTION

The present invention overcomes the limitations of conventional supervisory control and data acquisitions systems by providing an object-oriented framework for the development of personalized workflow applications that provide real time SCADA functionality, while maintain scalability to any number of users, and integration with existing legacy applications and systems.

In one embodiment, the present invention provides a computer implemented supervisory control and data acquisition system for managing distributed field devices that control or monitor physical or logical entities, and for providing users the ability to construct personalized SCADA applications (or workflows). In this embodiment, there is provided at least one virtual application service framework, and at least one personal application framework. These frameworks provide the functional objects and features with which the personalized SCADA applications can be built.

Each virtual application service framework includes three elements, a communications gateway, an object server, and an application cell base. The communications gateway is communicatively coupled to selected ones of the field devices to receive real time data from the field devices. This real time data is received in a format according to a communications protocol associated with the field devices; various different field devices may have different, non-compatible, proprietary formats. The communications gateway converts the real time data by reformatting it into standardized data format that is independent of the original format used by the field devices. The standardized data format specifies for each item of real time data a content and source of the real time data. In this manner, data from many different field devices, having different original source formats is converted into a single, standard data format. Preferably, each virtual application service and its communications gateway services one type of field device or control network; thus, where there are many different types of field devices that are being managed, multiple virtual application services are instantiated.

The application cell base is used to instantiate a variety of different types of application cells. An application cell is a cell which communicates data between the communications gateway and the object server to update data objects within the object server, or to provide current updates values from the object server to field devices supported by the communication gateway. Each application cell is coupled to the communications gateway to receive the reformatted real time data for at least one of the field devices and to apply to this data an inferencing or mapping operation to produce a derived real time data. For example, an application cell may average the inputs from a number of temperature sensors in a liquid reservoir to provide an overall average temperature. Or an application cell may provide a calibration function, which maps the received data from one range of values (e.g. fluid level in a tank) to a second range of value (e.g. fluid volume in the tank). In this manner the application cells provide a higher level of abstraction from the originally received data.

The object server is the data repository by which information is communicated between the virtual application service and the personal agent frameworks. The object server of the virtual application service is communicatively coupled to the application cells and receives from them derived real time data, and stores this data in a plurality of data objects. Each data object in the object server has various logical attributes which correspond to attributes of individual field devices, or collections of field devices. In this manner, the object server organizes what was originally completely disaggregated and logically unrelated data from many different field devices into a consistent representation that corresponds to the system being modeled.

For example, in a building management system, the raw, real time data from the field devices will be for many different types of field devices, such as lights, heating units, thermostats, window controls, ventilation systems, elevator banks, and so forth. As received by the communications gateway, the data from the many different field devices is very low level, and disaggregated in the sense that the communications gateway has no knowledge that relates data from different field devices (e.g. readings from different temperature sensors in the same tank). At the object server, however, this data can be organized in a logical manner, such as an abstraction for each floor of the building, within each floor, a number of rooms, and within each room controls for lights, temperature, window position, and so forth. The organization of the data (e.g. organization by floor, room, and type of control) is not present in the original real time data received by the communications gateway, but rather, is provided by the object server. While the object server provides for the correct logical organization, the application cells provide for the desired meaningful values of the data within this organization. The functionality of the application cells may be provided in a number of default application cell types or defined by the system administrator. Likewise, the organization of the object server is defined by the system administrator to be represent the real world system being managed.

The construction of personalized SCADA applications occurs within the context of the personal agent framework. Generally, each virtual application service may execute on a central host computer which acts as a server to remote computers executing personal agents of individual system users, though certainly the applications may be created by a systems administrator and preloaded unto the remote computers for use by others. Each personal agent framework includes a number of personal agents, and a number of service agents. Personal agents provide the presentation (via a graphical representation) of the underlying field devices being managed by the personalized SCADA application. Service agents couple the personal agents to the particular instances the object servers containing the data of such field devices. In this manner, each personal agent subscribes to data published by the object server.

Each personal agent including a plurality of presentation cells. A presentation cell is a cell which provides a graphical representation of some attribute or state of a field device, and that is dynamically responsive to real time changes in the attributes of the field device. For example, a presentation cell may graphically represent a temperature gauge as a bar graph, dial, or simple numerical value. Each presentation agent receives input data from a service agent, and maps that input data to its output graphical representation. The presentation cells thereby allow the user to visually monitor and control any number of field devices directly from their remote computers, while having assurance of real time quality of service.

As stated, the presentation agents each receive data from a service agent. A service agent is an entity which communicates between the object server and presentation cells to update the presentation cells with real time data (monitoring operation), or to take user inputs to the presentation cell, and pass them to the object server to update a data object therein, and thereby cause a change in the state of a field device (control operation). Each service agent represents an instance of a virtual application service, and is communicatively coupled to the object server of such virtual application service to receive derived real time data of a data object in response to the data object being updated by an application cell in the virtual application service. Each service agent is communicatively coupled any number of presentation cells within one or more personal agents to provide the updated data in the object server to the appropriate presentation cells.

The present invention provides a number of distinct advantages in creating enterprise wide real time management systems, and particularly for the creation of personalized supervisory and control data acquisition systems. First, the present invention provides for scalability to allow for large number of users, without bottlenecking at a host computer and the performance degradation typically associated with centralized data server. This feature of the present invention is provided by the replication of the object server and service agent in each of the personal agent frameworks which subscribes to data objects of the object server.

Second, the present invention provides for the complete integration of disparate control networks, field devices, and applications, regardless of differences in communication protocol or native data format. This feature of the present invention is provided by the ability of the object server to support a single object model for any and all types of data used by the different applications and system being integrated. More particularly, the object server enables a system administrator to define within a single, logical framework, any rich and complex hierarchy of different types of data used by different applications. For example, a single object server may store data object representative of physical systems, such as water valves, thermostats, elevator banks, and the like, and personnel data such as employees, dependents, wages, departments, managers, and so forth, thereby providing a single data repository for both physical control applications used in a SCADA application, and legacy applications, such payroll applications and human resource applications.

A third feature of the present invention is the ability to create personalized workflows for any managing any type of workflow or information management concern. This feature of the present invention is provided by the personal agents and service agents. These agents make available directly to the user a graphical environment for creating complex, personalized workflows. This approach is different from the traditional SCADA systems, where the control of the underlying field device and application is centralized. Instead, the present invention enables each end user to define and operate from any remote location, a personalized SCADA application specific to that user. This makes the personalized SCADA application fully distributed, as they execute on various remote computers, but with shared, real time accurate data stored in universally accessible object servers.

Another feature of the present invention is the use of consistent level of abstraction by which non-object-oriented applications can be integrated into a real-time, enterprise-wide object-oriented system. This feature of the present invention is provided by the single, integrated object model supported by the object server, and by the interfacing of non-object oriented applications via application cells. The single object model provides for common data storage of information from both object oriented, and non-object oriented applications. The interface to non-object oriented application is then provided by the application cells, which are programmer defined hold the application programming interface to some functional entity of a non-object application. The system developer defines the application cell to include the interface to the underlying enterprise, and exposes controls and presentation of such entities in the personal agent framework via presentation cells.

Accordingly, the present invention represents a substantial improvement over existing approaches for implementing real-time object-oriented systems.

BRIEF DESCRIPTION OF THE DRAWINGS

FIG. 2 is an illustration of the software architecture of the personalized SCADA system of the present invention.

DETAILED DESCRIPTION OF PREFERRED EMBODIMENTS OF THE INVENTION

System Architecture

Figure 1:
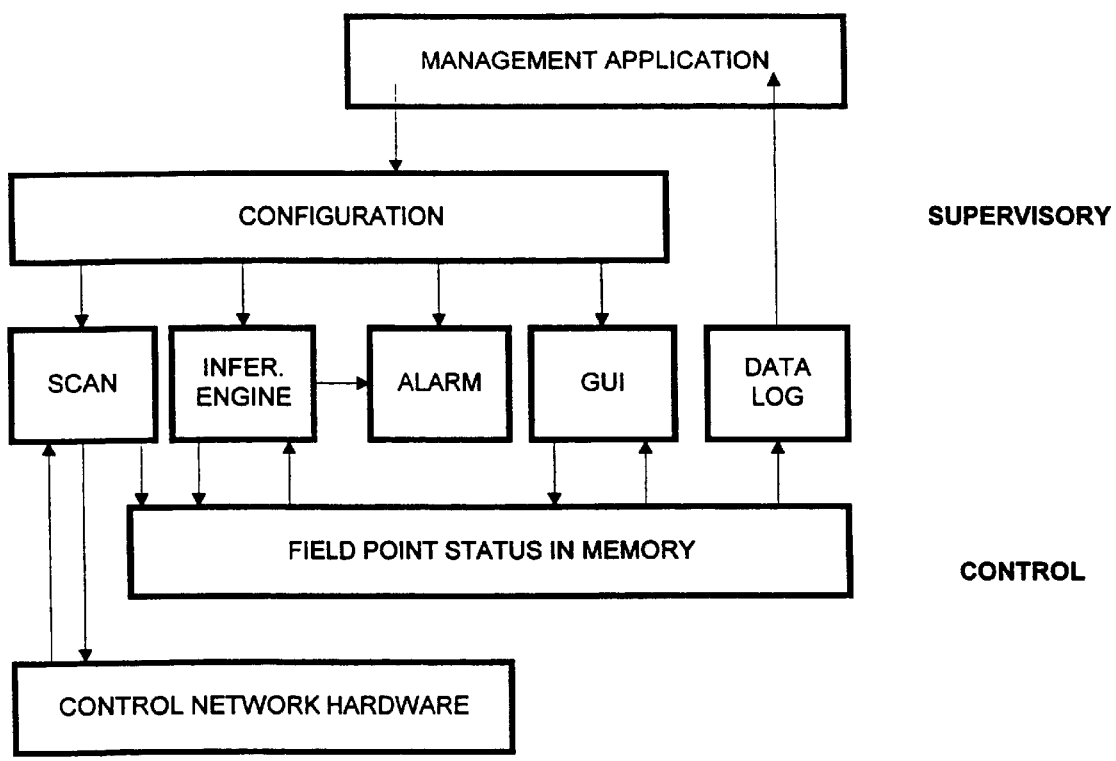
FIG. 1 is an illustration of the software architecture of a conventional SCADA system.
Figure 3:
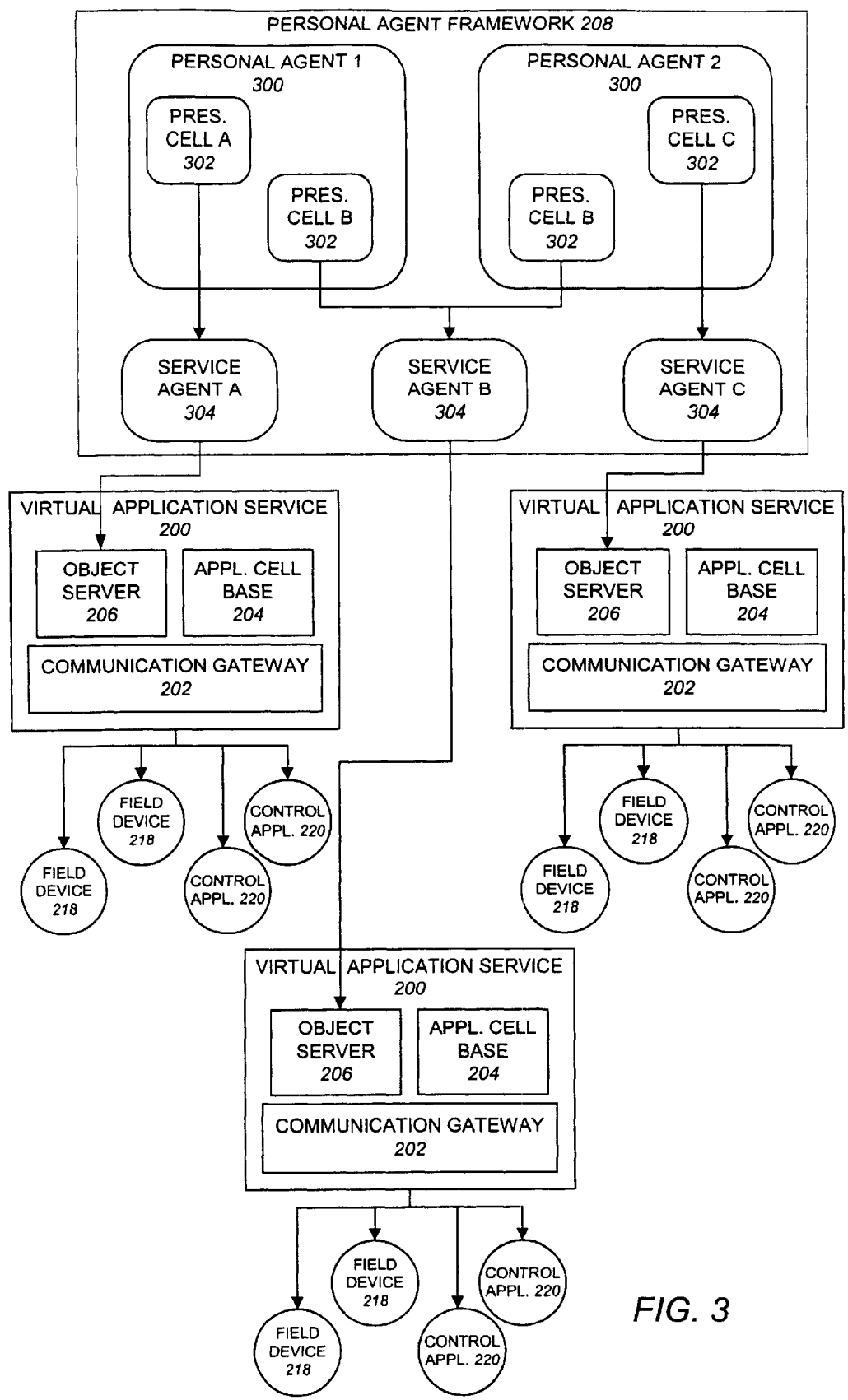
FIG. 3 is an illustration of the data flow between the virtual application services and the personal agent framework.

Referring now to FIGS. 2 and 3, there is shown the software architecture of one embodiment of the present invention, and the schematic data flow and application organization for an example personalized SCADA application. The software architecture comprises a framework for application development which in turn includes two sub-frameworks, a virtual application service 200, and a personal agent framework 208. A framework here means an application development environment which provides a rich set of classes and objects to enable flexible construction of applications. The virtual application service 200 includes a communications gateway 202, an application cell base 204, and an object server 206. The personal agent framework 208 includes a personal agent layer 300, a presentation cell layer 302, and a service agent layer 304. The virtual application service 200 communicates with an external device network 216 which provides communication with various distributed field devices 218 and control applications 220. Field devices 218 and control applications 220 are jointly referred to herein as "control points." The virtual application services 200 typically execute on a central host computer, while the personal agent frameworks 208 execute on remote computers; however it is entirely possible for either host or remote computers to execute both the virtual application service 200 and personal agent framework 208

As shown in FIG. 3, within an instance of the personal agent framework 208, there may be multiple instances of personal agents 300, each with its own presentation cells 302, some of which (e.g. presentation cell B) may be common between personal agents 300. Each presentation cell 300 is communicatively coupled to a service agent 304, which provides access to an object server 206 in one of the virtual application services 200. Via its service agent 304, a presentation cell 302 both receives real time updates of data from selected field devices 218 or control applications 220, and provides real time inputs to control the field devices 218 and control applications 220.

Virtual Application Service

The virtual application service 200 provides a consistent, high-level abstraction of the underlying real time data generated by the distributed and various control points, and makes this data available to the personal agent framework 208 of any of the remote client computers. This consistent level of data abstraction enables any variety of different SCADA applications to be developed and executed on the various remote client computers, while guaranteeing to all such clients, a high quality of service and access to a same collection of real time data. The virtual application service 200 guarantees client access to the real time data of the control points by publishing such data onto a communications network. This data is subscribed to by replicated instances of the virtual application service 200 in the form of service agents 304 within each of the personal agents 300 on the various clients. Replication of the virtual application service 200 in this manner creates a distributed application environment within which real time communication between different types of services is accomplished. Thus, any client containing an instance of a service agent 304 for one of the virtual application services 200 has immediate and current access to real time data held by the object server 206 of virtual application service 200. From the user's perspective, access to a particular virtual application service 200 and replication of a virtual application service 200 as a service agent 304 is by drag and drop actions in a graphical programming environment.

Communication Gateway

Each virtual application service 200 includes its own communication gateway 202 which provides an interface between the application cell base 204 and the various external control applications 220 and field devices 218. The communication gateway 202 is responsible for receiving real time data from the field devices 218 and applications 220 (which will be in various proprietary, device-dependent data formats) and converting it to a standard, device independent data format that can be read by the applications cell base 204. As each virtual application service 200 is specific to one of the underlying types or field device 218 or control applications 220, and each communication gateway 202 is likewise specific to communicating with such devices 218 and applications 220, and is adapted to convert the protocol of such devices to the standard data format. The communication gateway 202 operates with such protocols as BacNet (building automation), LonBus (control networks), and Echelon (control networks), MAPI (email applications), TAPI (telephony applications), and various programming protocols such as DDE, ODBC, and OLE.

More particularly, the input format to a communication gateway 202 comprises a low level byte stream of data packets containing real time data formatted according to a particular device protocol by the device network 216. In the typical device protocol, the data packets include a device ID, a parameter name, a type (application level and protocol specific), a data length, and the real time data. The real time data is itself typically unstructured, since the device network 216 is designed to assume that a receiving entity is capable of decoding the data directly.

The communication gateway converts this information into a standardized data format that includes fully structured and typed data, with an indication of the source and the value of the data. The indication of source specifies the particular field device 218 or application 220 which generated the data. Preferably the communication gateway structures the real time data into ints, floats, null terminated strings, and other standard types, which are then readable by application cells from the application cell layer 204. This reformatted data is preferably in the format of <name, value> pairs, where the name indicates the data source, and the value is the structured real time data. In this manner, unstructured, raw real time data from many different sources, having different and often incompatible protocols, is restructured into a consistent representation and format.

Application Cells

The application cell base 204 is a subframework which provides a mapping of the standardized real time data provided by the communication gateway 202 onto various data objects within the object server 206. The mapping of individual items of data is provided by individual application cells instantiated from the application cell base 204.

Each application cell is communicatively coupled to the communications gateway 202 to receive standardized data for one or more of the control points. The association of application cells with field devices 218 or control applications 220 is determined by the system administrator. For example, one application cell may receive data regarding the lighting levels for a bank of lights in a building, and another application cell may receive data for a number of valves controlling water flow in a cooling system.

Each application cell contains internal logic which transforms the received real time data to derived real time data. This transformation is by mapping the received standardized data to a data object in the object server 206, or performing more complex inferencing operations on the received data. Examples of mapping operations include statistical operations (e.g. averaging, standard deviations, trend analysis), interpolation, filtering, calibration (correlating in one range of data values onto a second range of values) and scaling. Inferencing operations include thresholding, comparisons, and any Boolean operations. For example, an application cell may receive a level reading for the level of a fluid in a reservoir, and apply a threshold operation which outputs values of "full" "low", and "empty" depending on the level being between corresponding thresholds, along with an identification of the source of the data, such as the specific reservoir.

These outputs would then be stored in an appropriate data object in the object server 206, where the user or system administrator defining the appropriate data object to the receive the derived real time data. Identification of the source of the data provides a context which can then be used by the personal agent framework 208.

The definition of each application cell's internal logic may be provided by a number of default application cells which are parameterized by the user, or specifically defined as needed by a systems administrator. For example, for a calibration application cell, a user would define a table correlating input values with output values. For a scaling application cell, the user would define an arbitrary scaling function. For a filtering application cell, the user would define a minimum amount of change in a current data value from a previous data value to allow for the current data value to be written as output.

Object Server

The object server 206 is a data store that receives from a number of application cells the derived real time data and stores that data in various data objects. Data objects store both the context or source of the data, and the derived data values determined by their application cells. As a data repository, the object server 206 enables service agents to subscribe to this data, and provide real time updates of such data to the presentation cells they service. The published data is in the form of <name, value> pairs, as described above.

Figure 4:
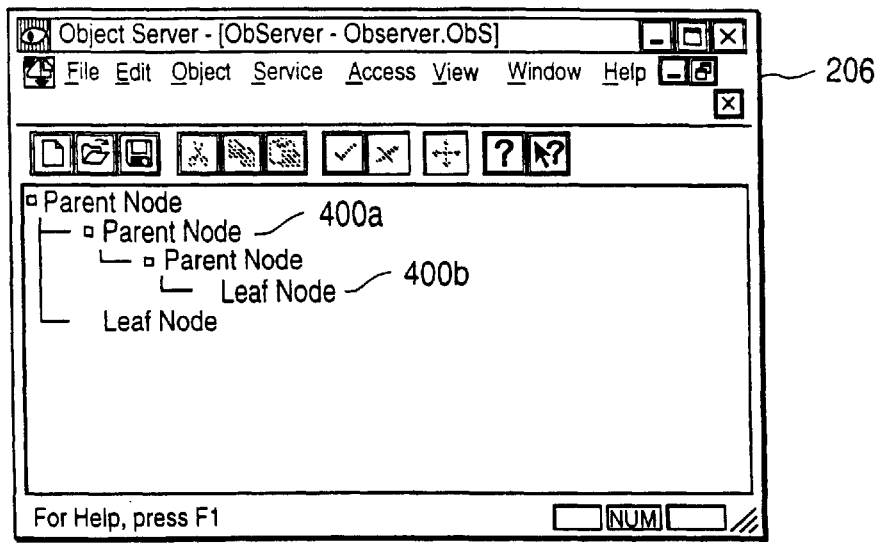
FIG. 4 is an illustration of the basic organization and user interface of the object server.

Referring now to FIG. 4, there is shown an example of the organization of an object server 206. An object server 206 is preferably tree structured, with various parent data objects 400a and leaf data objects 400b. (References to "data objects 400" herein refer to both parent and leaf data objects). The definition and logical relationships of data objects 400 is made by the system administrator, and preferably represents the logical or physical organization of field devices 218 and control applications 220 in the system being modeled, along with any entities used by legacy applications which are integrated into a personalized SCADA application.

Figure 5:
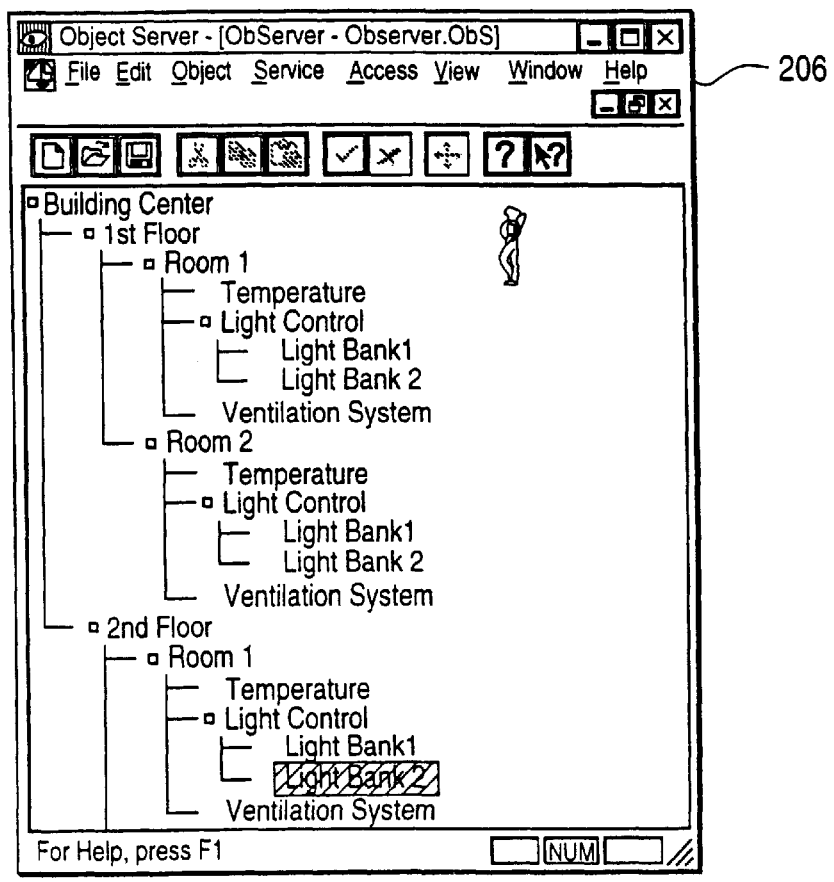
FIG. 5 is an illustration of an example of a collection of data objects in an object server.

Parent data objects 400a are logical constructs within the context of the object server 206, whereas leaf data objects 400b can represent either logical or physical constructs, such as field devices 218 and control applications 220, or entities from legacy applications. FIG. 5 illustrates an example. In FIG. 5, there is shown a set of data objects in an object server 206. A top level parent data object is defined to represent a building, here Building Center, which two floors, represented by the data objects of $1^{st}$ Floor, and $2^{nd}$ Floor. Each of these data objects has further data objects representing different rooms, Room 1 and Room 2. Each Room data object then has both leaf data objects 400b, such as Temperature and Ventilation System, and a parent data object Light Control which itself has leaf data objects 400b for two different Light Banks. This organization of data objects preferably represents the actual building being modeled. However, with respect to the actual data received by the communications gateway 202 from field devices 218 and control applications 220 in the building, such data has no such organizational information in it at all. Thus, the application cells map this data to the correct ones of the data objects 400 in the object server 206, thereby virtually "reconstructing" the building in the logical arrangement of data objects from the low level data of the field devices 218 and control applications 220.

The underlying implementation of the data objects 400 is shielded from the user, and is as follows. The data objects 400 are stored in block format, as byte stream data beginning from a base memory address location. Each parent data object 400a includes a list of its child data objects 400, and a type. The type is a logical type, as defined by the system administrator. Each leaf data object 400b has a type, an index value, and a size. The index value is an offset from the base memory address location, and the size is the size of the memory allocated to store the value held by the data object 400. In a preferred embodiment, the logical arrangement of the data objects is stored in an index table, which lists each parent data object 400a along with a list of its child data objects 400, and for each leaf data object 400b, lists the index, size, and type information.

Addressing of data objects in the object server 206 is preferably provided by hierarchical naming. Each data object 400 is addressed by its path in the object server 206. For example, the temperature of Room 1 of $1^{st}$ Floor is accessed by "Building Center.$1^{st}$ Floor.Room 1.Temperature." This type of addressing is used by both application cells and service agents to obtain or update data objects. Addressing of data objects may also be done with variables. For example, an application cell or presentation cell 302 may access any of the leaf data objects 400b of Room 1 by addressing "Building Center.$1^{st}$ Floor.Room 1.x", where x is a variable used to select which leaf data object 400b to obtain. Likewise, any address component can be replaced by a variable. When an address of a data object 400 is resolved, the object server 206 obtains the value of the data object using the index and size parameters stored in the underlying leaf data objects 400b.

Personal Agent Framework

The personal agent framework 208 comprises a network of presentation cells 302 and service agents 304 that are configured with one or more personal agents 300. The user can interconnect presentation cells 302 and service agents 304 so as to create control and monitoring applications which represent the user's personal workflow.

A personal agent 300 is a user customizable graphical interface through which the user interacts with the system of the present invention. A user may have multiple personal agents 300 configured on their remote computer, each with its own collection of presentation cells 302 and service agents 304, as schematically illustrated in FIG. 3.

Figure 6:
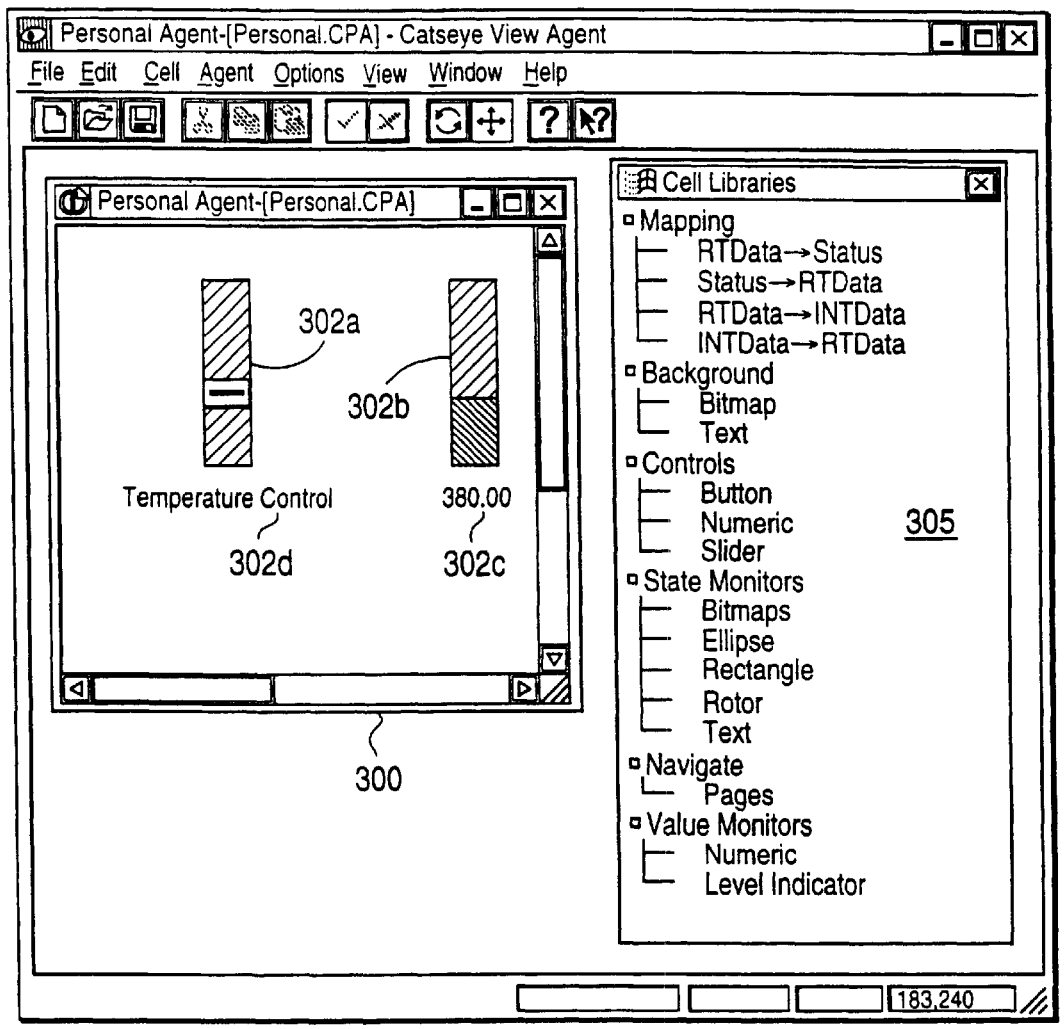
FIG. 6 is an illustration of an example personal agent framework and library of presentation cells.

Referring to FIG. 6 there is shown an example of a personal agent 300 including several presentation cells 302, including a slider presentation cell 302a, a level indicator presentation cell 302b, a numeric display presentation cell 302c, and text presentation cell 302d. The slider presentation cell 302a is a control cell that allows the user to graphically manipulate the slider, in response to which the presentation cell outputs a value corresponding to the relative position of the slider between the upper and lower boundaries, and a user defined range for these boundaries. Presentation cells such as these are placed into a personal agent 300 by selecting the type of presentation cell from the cell library 305 and dragging and dropping it in the personal agent 300. A presentation cell 302 can take inputs from either a service agent 304, or another presentation cell 302.

In this example, the slider presentation cell 302a controls a temperature, as indicated by text presentation cell 302d which is merely a text label. The slider presentation cell 302a would typically be coupled to a temperature data object 400 in an object server, such that direct manipulation of the slider updates the stored data in the data object 400. Numeric presentation cell 302c and level indicator presentation cell 302b display the current value of some data object. In this example, the slider presentation cell 302a, the numeric presentation cell 302c, and the level indicator presentation cell 302b are all coupled to a same data object, so that changes in the slider position are reflected, in real time, by corresponding changes in the height of the level indicator and the value of the numeric display.

Presentation cells 302 include various user configurable properties, such as data inputs and outputs, valid ranges of data inputs and outputs, position, border, and the like. In particular, the selection of the data objects 400 in an object server 206 that are the inputs and outputs of a presentation cell 302 is managed through simple drag and drop operations. The definition of such properties is further explained below.

In the preferred embodiment, various types of presentation cells are provided, including standard presentation cells, background presentation cells, and telephony presentation cells.

Standard presentation cells are used to control and monitor field devices 218 and control applications 220. Standard presentation cells include four further types of cells:

State monitors: these are presentation cells that monitor the transition of a control point between two (or more) states, and graphically depict discrete changes in state. Exemplary state monitor presentation cells include bitmaps (which select a different bitmap to display depending on the state of the control point), colored shapes (which change color), text labels (which change text strings), and rotors (which rotate and change color dependent on state).

Value monitors: these are presentation cells that monitor and graphically depict continuous changes in the value of an attribute of a control point. Exemplary value monitor presentation cells include numeric displays and level indicators, as shown in FIG. 6, at 302c and 302b respectively.

Controls: these are presentation cells that allow user modification of an attribute of a field device or control application. Control cells include buttons to increment, decrement, or toggle a value (with user defined value changes); to pulse a value while depressed; numeric input dialogs for direct input of a numeric amount; and slider controls for continuously variable inputs (such as slider control 302a).

Navigate cells: these are presentation cells that enable the user to navigate between different personal agent windows.

Background presentation cells display a passive bitmap image or text label, and are not associated with any field device.

Telephony presentation cells represent a mechanism for interpreting commands and monitoring field devices over a telephone system.

Examples of various types of presentation cells are further detailed in Appendix B.

Service Agents

A service agent 304 is an entity that interfaces between a presentation cell and the object server 206 to provide the presentation cell with updates of the data objects from the object server 206, and to update the data object with inputs from the presentation cell 302. As shown in FIG. 3, a service agent 304 can service a number of different presentation cells 302 in different personal agents 300. A service agent 304 provides access to all data objects 400 in a single object server 206. The service agent 304 determines which particular data object 400 to access for a particular presentation cell 302 based on the input/output configuration of the presentation cell. A service agent 304 is associated with a personal agent 300 by a drag and drop operation.

Service agents 304 perform name resolution of the data objects 400 by reading the index tables of the object server 206, and then accessing the underlying data objects 400 directly from the memory of the object server 206.

The present invention provides for a fully distributed object server 206 and data objects 400 that can be shared by different processes, in either a shared or separate memory address spaces. The logical structure of each data object is known by the application cell 204 or presentation cell 302 that reads the data object 400. Each cell provides its own methods for updating the data, whereas the object server 206 merely holds the data. This separation of data and process enables the data objects 400 to be shared by diverse processes. There are two possible scenarios, where the object server 206 resides in shared address space, but is accessed by presentation cells 302 and application cells 204 in different address spaces, and where the object server 206 resides in multiple address spaces on different computers.

In the first case, the address space is a shared address space with the personal agent framework 208 or the virtual application service 200 executing on the same computer system as the object server 206, but each in their own address space. In this situation, both the service agents 304 and application cells 204 have direct access to data objects 400 within the object server 206, but each entity has different access methods. Access to the data objects 400 from different address spaces is provided by the direct addressing and indexing scheme described above. Thus, the object server 206 supports distributed access by processes in different address spaces, and capable of executing at the same time.

Figure 7:
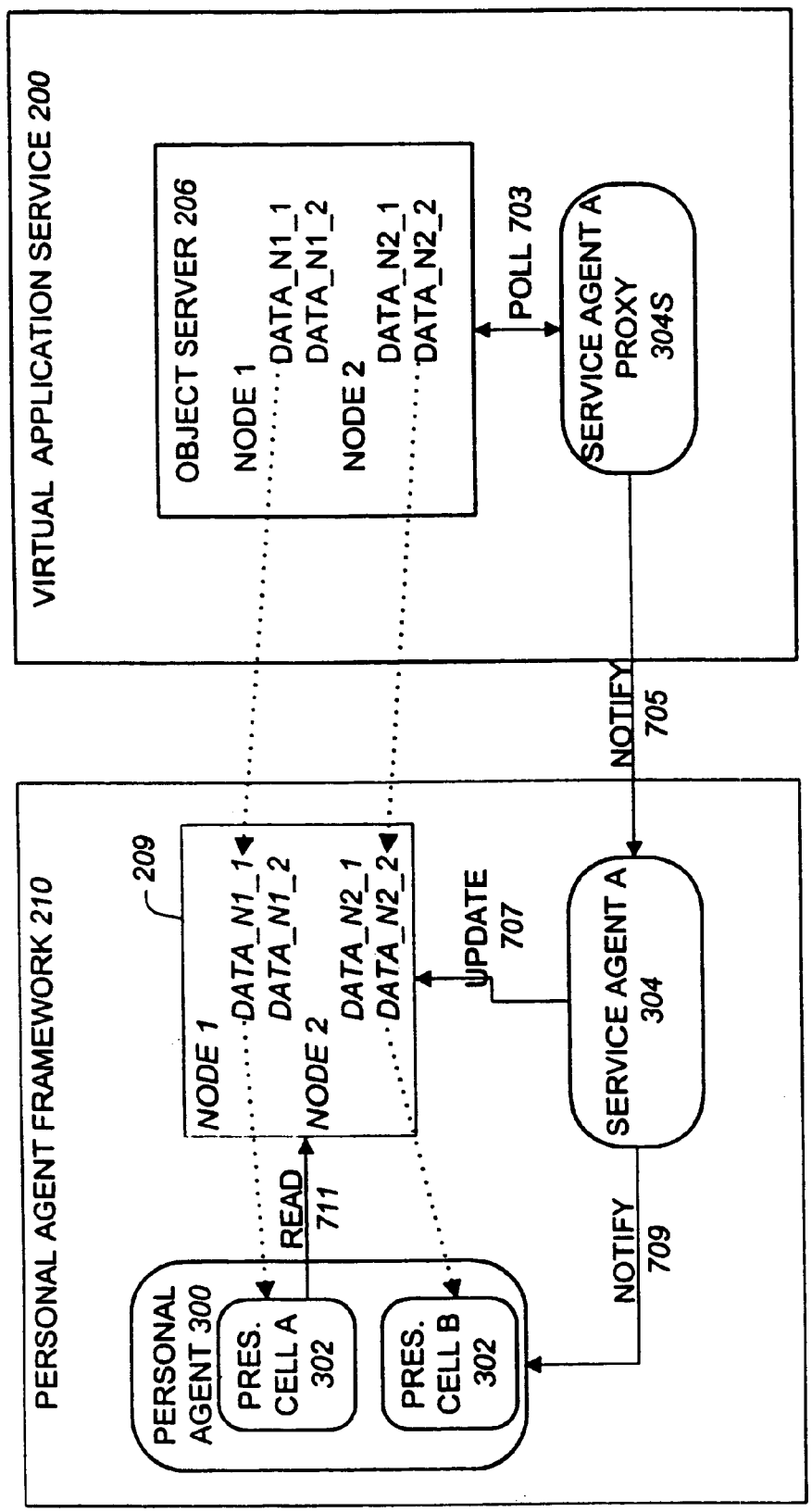
FIG. 7 is an illustration of the replication of an object server from a host computer to the personal application framework of a remote computer.
Figure 8:
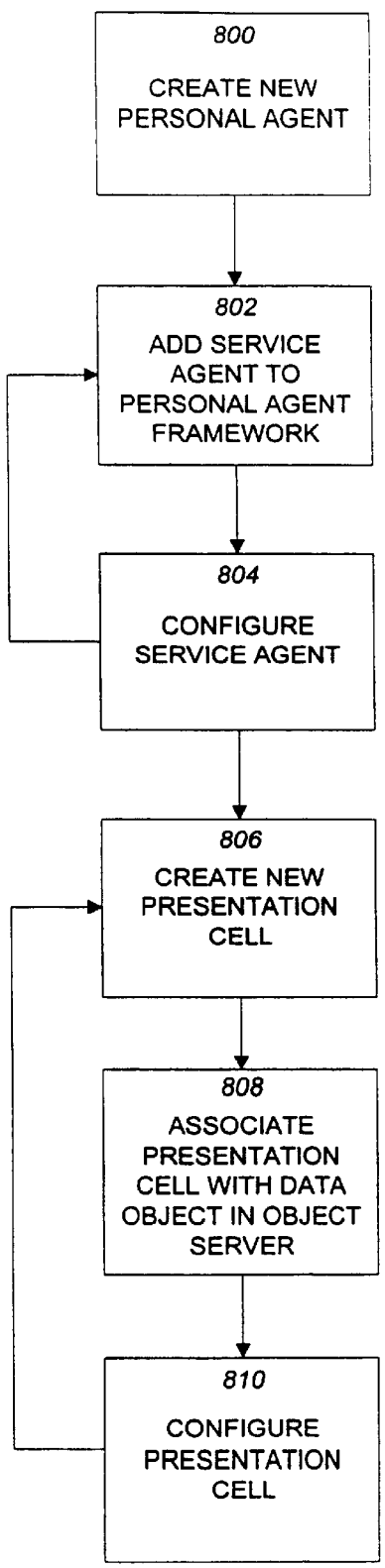
FIG. 8 is a flowchart of the process of constructing a personalized SCADA application.

In the second scenario, two separate blocks of data are created, one in a client address space on a client computer, and one in a server address space on a server computer. The client object server 206 operates as a replication of the object server 206 on the server computer. Referring now to FIG. 7, there is shown an illustration of the implementation of service agents 304 in regards to how they provide information from an object server 206 to a presentation cell 302 in this distributed model.

Each service agent 304 within a personal agent framework 208 has a corresponding service agent proxy 304S in the virtual application service 200 containing the object server 206 which holds the data objects needed by the various presentation cells 302. The proxy 304S provides personal agent framework 208 having the service agent 304 access to the object server 206 in order to both receive and forward data to the object server 206. Messaging between the service agent 304 and service agent proxy 304S is via a connection oriented TCP socket. Each data-exchange message includes a header that contains a length of the packet, a index of the data object attributes, and the data values of the attributes between sent.

Each service agent 304 also includes references to each of the presentation cells 302 which it services, and for each of these presentation cells 302, the address of the data object 400 which contains the data of interest to the presentation cell. For example, in FIG. 7, presentation cell A may subscribe to Node 1.Data_N1_1 while presentation cell B subscribes to Node2.Data_N2_2. Likewise, the service agent A proxy 304S holds a list of the data objects 400 in the object server 206 that are associated with various presentation cells, and the network locations of their corresponding service agents 304. These subscriptions are indicated by the dotted lines connecting the data objects to the presentation cells. Within the personal agent framework 208 there is provided a replicated data store 209 which holds the updated data replicated by the service agents 304. The personal agent framework 208 can support multiple data stores 209, each of which is associated with a single service agent 304. A replicated data store 209 is used instead of having each presentation agent 302 store its data locally since multiple presentation agents 302 can both subscribe to, and change, a particular data object 400 on the object server 206.

To update the presentation cells 302 when operating to monitor real time data, the service agent proxy 304S within the object server 206 periodically (per user configuration) polls 703 each of the data objects 400 within the object server 206 to which it subscribes, and determines whether there has been any change in the data. If the data object 400 has been updated since the last poll, the service agent proxy 304S forwards 705 the updated data object 400 to the service agent 304, which stores 707 it in the replicated data store 209. The service agent 304 notifies 709 each of the presentation cells 302 which subscribe to the particular data object that was updated, and each of these presentation cells 302 reads 711 the updated value from the replicated data store 209, and updates its graphical representation of the data accordingly. This data flow is shown by the solid connection lines. In an alternate embodiment, the service agent 304 does not notify each of the subscribing presentation cells 302 ; instead, each of these presentation cells 302 includes a user defined polling frequency with which the presentation cell reads from the replicated data store 209 the value of the data object to which it subscribes, and updates itself (e.g. its graphical display) accordingly. This implementation reduces the overhead associated with a notification mechanism, and typically provides sufficient quality of service, depending on the polling frequency of both the service agents 304 and the presentation cells 302.

Updating the data objects 400 of the object server 206 follows an inverse process. In this case, a presentation cell 302 invokes its service agent 304 to update a data object in the object server 206, passing in the updated value and address of the data object. (The computation of the updated value is determined by the presentation cell, which may, for example, map the position of a slider on the screen display to an updated value for a controlled field device.) The service agent 304 writes the updated value to the replicated data store 209, and invokes its corresponding service agent proxy 304S, passing in the updated value. The service agent proxy 304S queues itself to update the object server 206 at the specified data object address.

Personalized SCADA Applications

The present invention enables users to construct personalized SCADA applications or workflows by drag and drop operations to create personal agents 300 from combinations of service agents 304 and presentation cells 302.

Referring now to FIGS. 8 to 11, there is shown the process and user interfaces by which the user creates a personalized SCADA application.

The user begins by creating 800 a new personal agent 300. This personal agent 300 will not contain any presentation cells 300. The user may optionally configure the properties of the personal agent 300 which include the following:

TABLE 1

Personal Agent Properties

| | |
|---|---|
| Size | (X,Y) extent of the personal agent display window, in pixels. This defines the size of the area in which presentation cells can be placed. |
| Caption | Name of the personal agent that appears in title bar. |
| Background Color | Color of the background. |
| Grid Spacing | Spacing of grid for placing presentation cells, to effect a snap to grid. |
| Auto-activate | Toggle; activates personal agent on launch. |
| Enable Auto Login | Toggle; enables user's access rights on launch. |
| Enable Password | Toggle; requires password to edit personal agent and presentation cells, no password has viewing rights only. |
| New Password | Sets password. |
| Enable Resources | Toggle; allows access to presentation cells and service agents in other personal agents. |
| Share Resources | Toggle; allows other personal agents (via Enable Resources toggle) access to presentation cells and service agent of this personal agent. |
| Resource Watch | Timeout period (in milliseconds) to prevent system hang from handling too many presentation cells/service agents. |
| System Timer | Minimum time interval between successive updates of a presentation cell in this personal agent. Between 100 ms and 2000 ms. |

Figure 9:
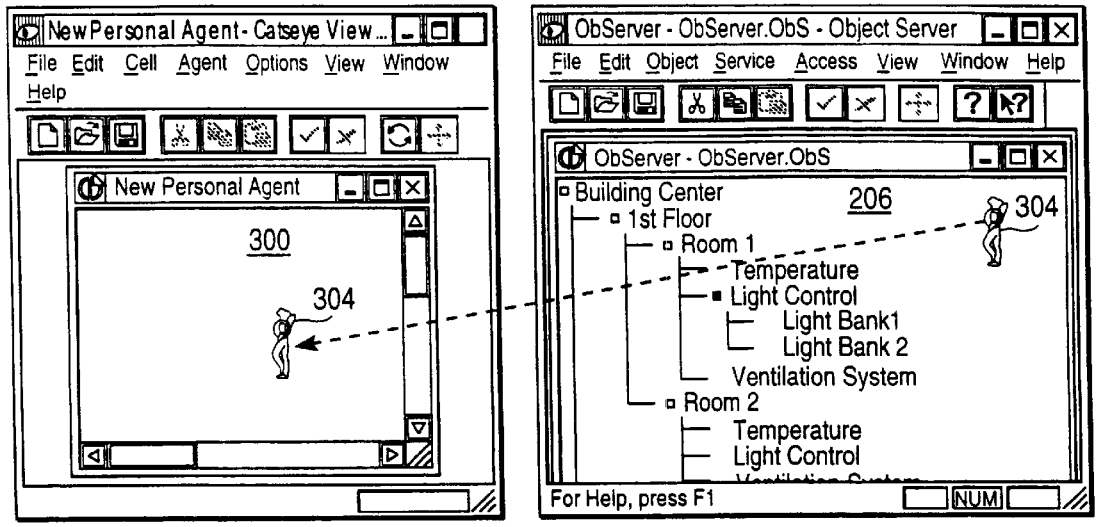
FIG. 9 is an illustration of a drag and drop operation for associating a service agent with a personal agent framework.

The user then associates 802 with the personal agent 300 a service agent 304 from an object server 206 that contains the data objects 400 of interest. Each object server 206 has at least one service agent 304 associated with it, which is graphically represented to the user in the object server 206 window. FIG. 9 illustrates the preferred mechanism for associating a service agent 304 with a personal agent 300 by a drag and drop of the service agent 304 from the object server 206 into the personal agent 300 window, as indicated by the dashed line. At this point any new presentation cells that are instantiated in the personal agent 300 will have access to any data object 400 in the object server 206 having the associated service agent 304.

The user then can configure 804 the properties of the service agent 304. These properties include:

TABLE 2

Service Agent Properties

| | |
|---|---|
| Service Agent Name | Name of the service agent 304, which will be used by other objects to refer to this service agent 304. |
| Scan Time | Length of time in milliseconds between successive reads of the object server 206 by the service agent 304. |
| Object Server Name | Name of the object server 206 serviced by this service agent 304. |
| Type | The type of data contained in the object server 304. This is an application dependent type definition. That is, different application specific types may have the same underlying programming language types. Cells accept only known types. |
| Size | Length of each data object in the object server 304, in bytes, and used when exchanging data packets. |
| Network Address | IP address of a host computer on which the object server 206 is located. This allows the remote computer on which the personal agent framework 200 is executing to access object servers 204 anywhere in the world via TCP/IP protocols. |

TABLE 2-continued

Service Agent Properties

| | |
|---|---|
| Enable Network Address | Toggle; enables the personal agent 300 to access remote object servers 204. |

The user can configure any of these parameters, or use their default settings. The process of associating and configuring a server agent 304 can be repeated for any number of different object servers 204, with a single service agent 304 being selected for each object server 206.

Associating the service agent 304 with the personal agent framework 208 initiates the replication of the object server 206 serviced by the service agent 304. Initially all of the data objects from the host object server 206 are duplicated into the client's object server 206. To ensure that the correct internal memory arrangement of the client's object server 206 for addressing purposes, the service agent on the client computer queries the host service agent proxy 304S to determine all of the data objects 400 that available in the host object server 206 by sending a data object name and internal address of the data object within the client's object server as a relative offset in memory from a base address of the object server. The host computer replies with its offset for this data object. The service agent 304 then updates the object server index tables with the correct internal address. The user may then delete any unnecessary data objects.

Figure 10:
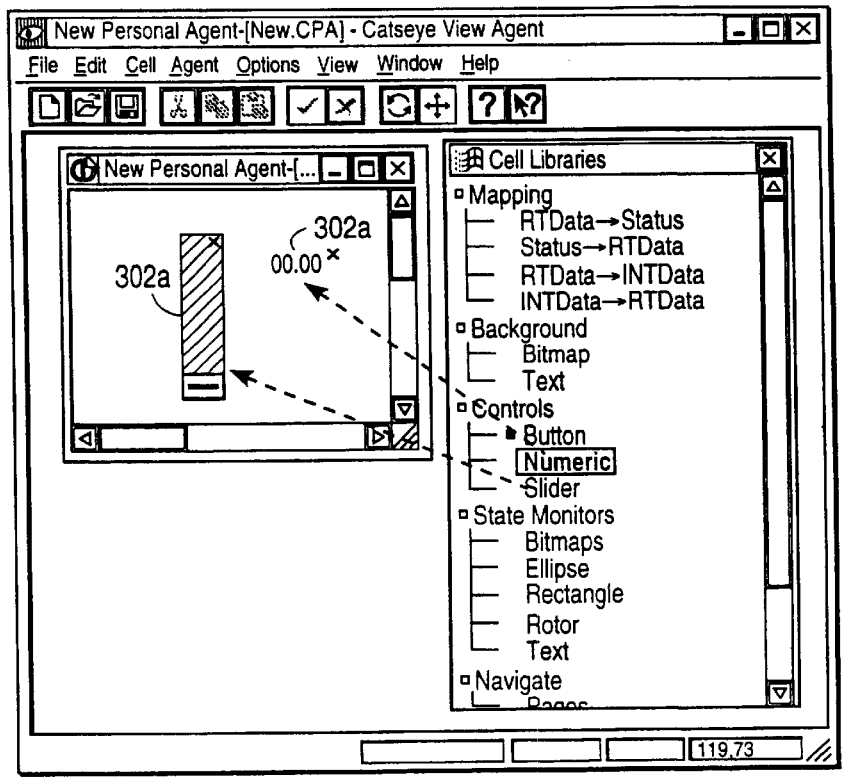
FIG. 10 is an illustration of a drag and drop operation for instantiating presentation cells in a personal agent framework.

The user next creates 806 one or more presentation cells 302 that will be linked, via the service agent 304, to the object server 206. In the preferred embodiment, creation of presentation cells 302 is also performed by drag and drop operation. FIG. 10 illustrates this mechanism, with the drag and drop selection of two presentation cells 302 from the cell library 305, a slider presentation cell 302a, and a numeric display presentation cell 302b. Application cells may also be created and configured (as below) in the same manner as presentation cells 302.

Figure 11:
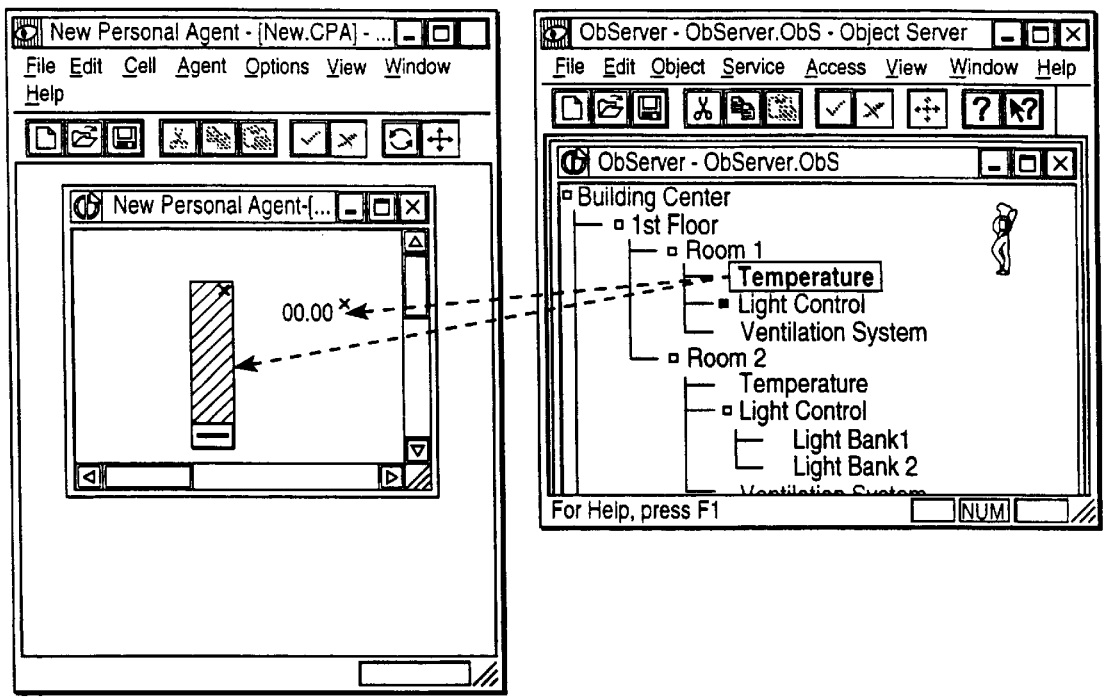
FIG. 11 is an illustration of a drag and drop operation for associating a data object with a presentation cell.

At this point, the presentation cells 302 are not associated with any particular data object 400 in the object server 206, and thus cannot monitor or control any control points that update such data objects 400. To associate 808 a presentation cell 302 with one of the data objects 400 (or more depending on the type of presentation cell), again a simple drag and drop operation is used. FIG. 11 illustrates the selection of the temperature data object 400b in the object server 206 and its drag and drop association with both the slider presentation cell 302a, and the numeric display presentation cell 302b. As a result, the slider presentation cell 302a will now control, in real time, the value of the temperature data object 400b, and the numeric display presentation cell 302b will display that resulting value. Thus, even where the object server 206 is located on a different computer from the client computer containing the personal agent 300, both the slider presentation cell 302a and the numeric display presentation cell 302b will be coupled via the service agent 304 to the temperature data object 400b, and control and respond to changes in its state accordingly.

The user then configures 810 the properties of the presentation cells 302. These properties include:

TABLE 3

Presentation Cell Properties

| | |
|---|---|
| Display Properties | These properties effect the display and editing aspects of the presentation cell. |
| Name | Name of the presentation cell. This name will be used by other cells and service agents to address this presentation cell. |
| Border/No Border | Toggles whether a border is displayed. |
| Border Style | Type of border if Border enabled: flat, raised, or sunken. |
| Top Left Coordinate | Position of top left hand upper corner relative to window of personal agent. |
| Dimensions | Height and width of presentation cell. |
| Lock in Place | Toggle; locks the presentation cell in current position to prevent movement. |
| Fixed Size | Toggle; disables resizing of presentation. |
| Disable Delete | Toggle; prevents presentation cell from being deleted. |
| Bindings | Bindings specify the particular object server 206 or other presentation cell 302 that will provide the input and output data of this particular presentation cell. |
| Input Channel Service | Name of the object server 206 or presentation cell 302 providing the input data to this presentation cell. This name will be automatically defined by dragging and dropping a data object 400 or presentation cell onto this presentation cell. |
| Input Channel Address | Where the input channel service is an object server 206, this is the path name of the data object 400 within the object server 206 to which this presentation cell subscribes. |
| Interlock Channel Service | An interlock is another cell (B) which is deemed a guard for the current cell (A). Cell A does not operate if cell B is in alarming stage. Thus, the interlock channel service is the name of the cell B, or service agent if it is an object server object. |
| Interlock Channel Address | If B is an object of object server, this is the address of the object server. Otherwise, not used if cell B is a cell. |
| Mappings | Mappings define ranges of values that the presentation cells maps from its inputs to its outputs. |
| Data Source (From, To) | End points of a range of values that are acceptable input values. |
| Display (From, To) | End points of a range of values that are mapped on the display. |

These properties are applicable to all presentation cells. In addition, presentation cells can have specific display properties depending on their types. For example, for bitmap state monitors, the user specifies two bitmaps to use, one for each of two states of the underlying field device, along with the values of the control point that define each state.

After each instantiation of a presentation cell (or application), the service agent(s) 304 within the personal agent framework 208 queries the presentation cell to obtain an address of any data object accessed by the cell. The service agent either creates or updates an a link to the appropriate parent object according to its defined network address information.

The selection and configuration of presentation cells 302 continues in this manner until the user has constructed a desired personalized SCADA application.

Figure 12:
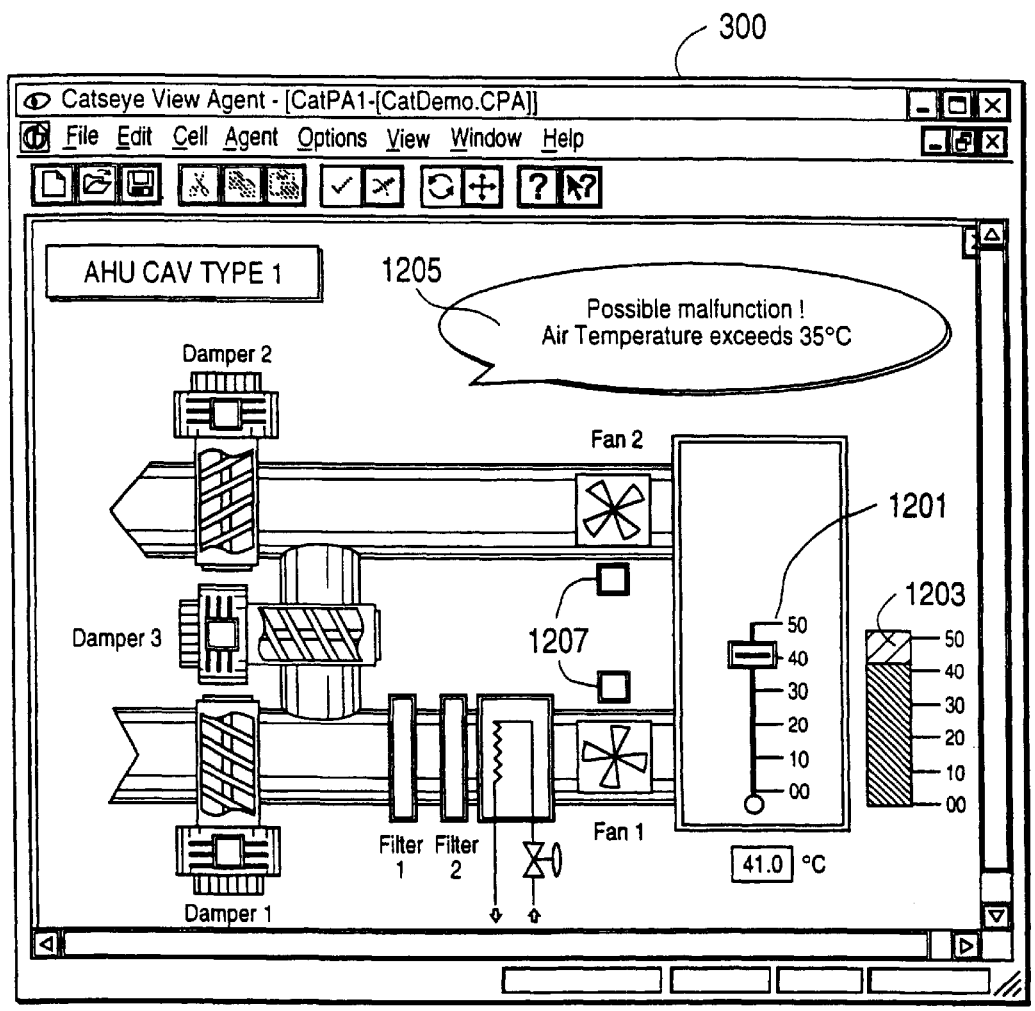
FIG. 12 is an illustration of a complete personalized SCADA application.

An example personalized SCADA application is shown in FIG. 12. FIG. 12 illustrates a typical automatic heating unit (AHU) control interface created with the personal agent framework 208. A slider presentation cell 1201 is used by the user to setup the required temperature of the unit. A level indicator presentation cell 1203 is used to show the monitored temperature of the unit. A state monitor presentation cell 1205 is used to notify the user of a critical temperature level. The user can turn on fans in the unit via the toggle presentation cells 1207. The personal agent 300 of FIG. 12 is a personalized SCADA application is contrasted with a conventional alarm condition and management function that is completely centralized, being configured and operated from a centralized location, and thereby making it difficult to configure to the user's particular needs. In contrast, the user of the personalized SCADA application of FIG. 12 can configure the AHU as desired, while still having a guaranteed quality of service.

System Operation Scenarios

The present invention supports a number of operational scenarios, including monitoring, control, automation, and notification. Examples of these scenarios are described with respect to FIGS. 13–16. In these examples, it is assumed that the user or system administrator has configured an object server 206 including a fully structured set of data objects 400 to receive real time data from various field devices 218 and control applications 220, and has further configured a personal agent 300 including at least one presentation cell 302 and service agent 304 to provide the presentation cell 302 with access to the object server 206.

Monitoring Operation

Figure 13:
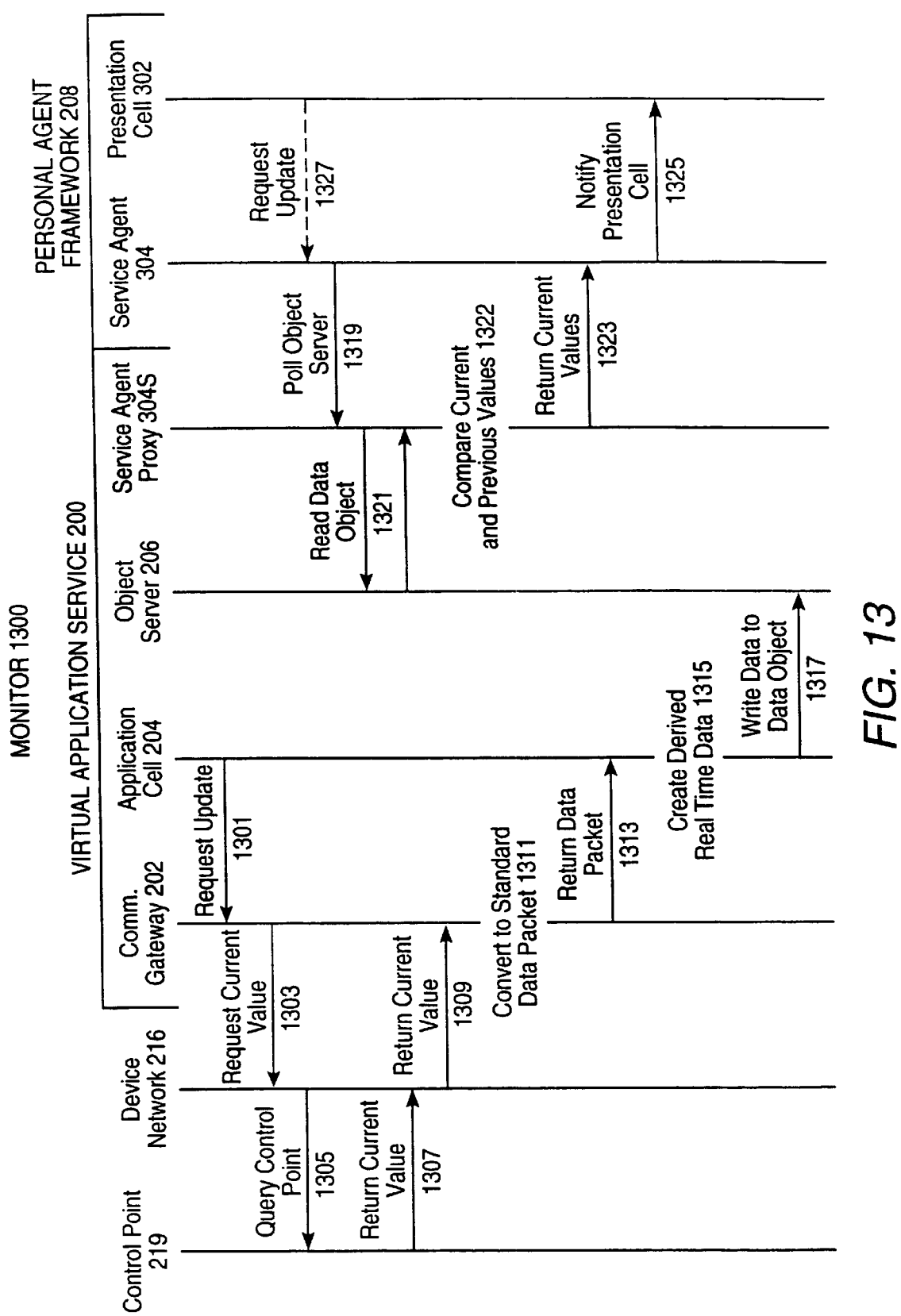
FIG. 13 is an event trace of a monitoring operation.

Referring now to FIG. 13 there is shown an event trace of a typical monitoring operation 1300 in accordance with the system architecture of the present invention. The application cell 204 is configured (either with default or user specified values) to periodically update 1301 itself by invoking the communication gateway 202, passing in the logical address of the underlying control point 219, which may be a field device 218 or control application 220, to which the application cell 204 subscribes.

The communication gateway 202 passes 1303 the logical address of the control point 219 to the device network 216 and requests a current value of the specified control point 219.

The device network 216 queries 1305 the control point 219, which returns 1307 its current value to the device network 216. The device network 216 returns 1309 this value to the communication gateway 202. As received by the communication gateway 202 the real time data from the device network 216 is an un-calibrated continuous data stream, formatted according to the particular proprietary communications protocol of the device network 216.

The communication gateway 202 converts 1311 the received real time data sample from its proprietary format into a standard data packet form that includes its source or parameter identification (e.g. temperature sensor #1) and its actual value. In addition, explicit type coding of the data types of the converted real time data may be used (e.g. coding for floating point, integer, string, arrays, etc.). In this manner the communication gateway 202 transforms the continuous stream, proprietary real time data into standard data packets which may be read by the application cell 204. The communication gateway 202 then returns 1313 the standard packet data to the application cell.

As described above, an application cell 204 contains internal logic that transforms 1315 the standardized data into derived real time data. The application cell 204 may apply any of a variety of inferencing or mathematical operations as described above. The application cell 204 then writes 1317 the received data packet onto some data object 400 within the object server 206, providing a context for the data that was not previously available. The application cell 204 holds a reference, in the addressing scheme described above, to a single data object 400 in the object server 206. The updated data object 400 is available to any service agent proxy 304S and hence presentation cell 302 that subscribes to it.

Independently, the service agent proxy 304S maintains a list of the data objects 400 in the object server 206 that are subscribed to by presentation cells 302 within the personal agent 300 it inhabits. The service agent 304, periodically and asynchronously of the behaviors of the application cell 204 and control points 219, polls 1319 object server 206 via its corresponding service agent proxy 304S, for the current value of each of the data objects 400 it tracks. The service agent 304 passes the name of the object server 206 and the address of each of the data objects 400. For each of the specified data objects 400 the service agent proxy 304S reads 1321 the value of the data object 400 from the object server 206, and compares 1322 it with a previous value. If the current value is different from the previous value, it returns 1323 the current value, along with the address of the data object 400, back to the service agent 304.

Finally, the service agent 304 asynchronously notifies 1325 the various presentation cells 302 of the updated data object 400, which in turn read the data either from the object server 206 or a replicated object store 209 (as described above with respect to FIG. 7). Each presentation cell 302 applies the appropriate interpretation of the updated data, including scaling, mapping, calibration, or the like, and updates its outputs, such as adjusting a numeric display, a level indicator, or a state dependent bitmap or text.

The monitoring process described here is asynchronous. In addition, monitoring can be synchronous, beginning with the presentation cell 302 requesting 1327 an updated value of a data object 400 from a service agent 302, which in turn will initiate the polling 1319, reading 1321, and notify 1325 operations as described above.

Notification Operation

A notification operation is similar to the monitoring operation, but takes the additional step of causing a condition to occur and an action such as sound alert, email, telephone. For a notification operation, a presentation cell 302 will have a user defined conditional behavior defined by a rule condition, an action to perform if the condition is satisfied, and a target entity (presentation cell or application cell) on which to perform the action. More particularly, after the presentation cell 302 is notified 1325 by the service agent 304 and reads the updated data, the presentation cell 302 determines whether the condition is satisfied. If so, the presentation cell initiates the action upon the target. For example, a presentation cell which monitors a temperature level may have a rule condition which tests whether the temperature exceeds a threshold value, and if so, perform the action of changing the state of another presentation cell 302 which controls the on/off state of a cooling system. A presentation cell may also act as a publisher of data, similar to an object server 206. In this case, the name of the publishing presentation cell is used instead of the name of the service agent by the subscribing presentation cell.

Control Operation

Figure 14:
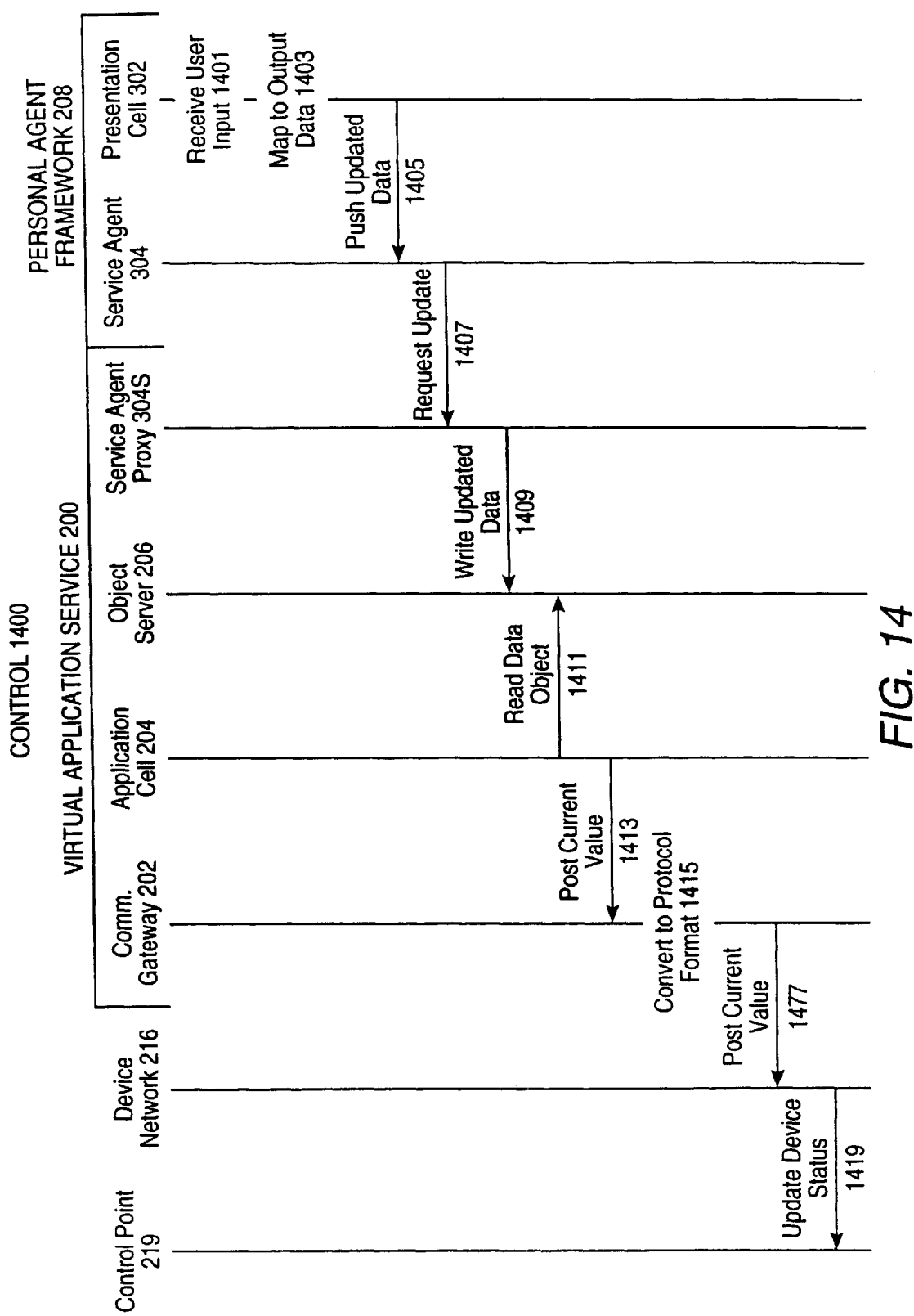
FIG. 14 is an event of a control operation.

A control operation is similar to a monitoring operation, but operates synchronously, and is initiated by the presentation cell 302. FIG. 14 illustrates an event scenario in which the user changes the state of the pump.

The control operation 1400 begins with the presentation cell 302 receiving 1401 a user input defining a new state value, numeric value or other data input. For example, the user can graphically adjust the position of a slider presentation cell 302 controlling a temperature setting to input a new temperature.

The presentation cell 302 maps 1403 the input data (e.g. the new position of a slider) to an output format (e.g. a temperature value) understood by the object server 206. The presentation cell 302 outputs 1405 the transformed data as a <name, value> pair, where the name is the address of the data object 400 defined as the presentation cell's output channel, and the value is the computed value from the user's input.

This output data is provided 1405 to the service agent 304, which invokes 1407 its corresponding service agent proxy 304S in the object server 206 and passes in the updated data. The service agent proxy 304S stores 1409 the data in the object server 206, at the specified address of the data object 400.

There will be application cell 204 that is defined by the user to update/read the specified data object 400 in the object server 206. This application cell 204 asynchronously and periodically reads 1411 the data object 400 and obtains the current data object value.

The application cell 204 then passes 1413 the updated value to the communication gateway 202, providing the logical address of the control point 219 to be updated.

The communication gateway 202 converts 1415 the updated data value to the protocol format used by the device network 216, and transfers 1417 the logical address of the control point 219 and updated data to the device network 216. The device network 216 determines the appropriate physical location and control point 219 from the logical address information, and implements the control operation by changing the state of the control point in accordance with the control data.

Automation Operation

An automation operation is an operation that takes place automatically based on either an event (condition satisfaction) or a time (periodic, or timed), which then instantiates a control operation. Automation operations are defined within application cells 204. For event driven automation, the application cell contains a user defined data input source, a condition which is to be satisfied by the data received, an output data or action to be performed, and a target entity for receiving the output. The input source will be a selected data object 400 from an object server 206. The output data may be a numeric value, or a Boolean. The target may be any other application or presentation cell, or any data object. In a preferred implementation, the condition to be satisfied is established by defining upper and lower bounds for a valid range of the input data. For a time based automation, there is a user defined timer, defining the periodicity of the automation operation.

Figure 15A:
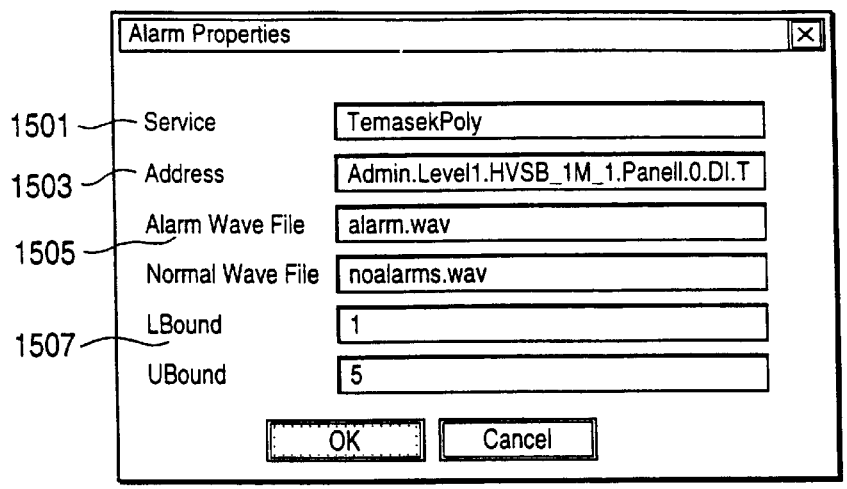
FIGS. 15a–15c are illustrations of application cells for defining an automation operation.
Figure 15B:
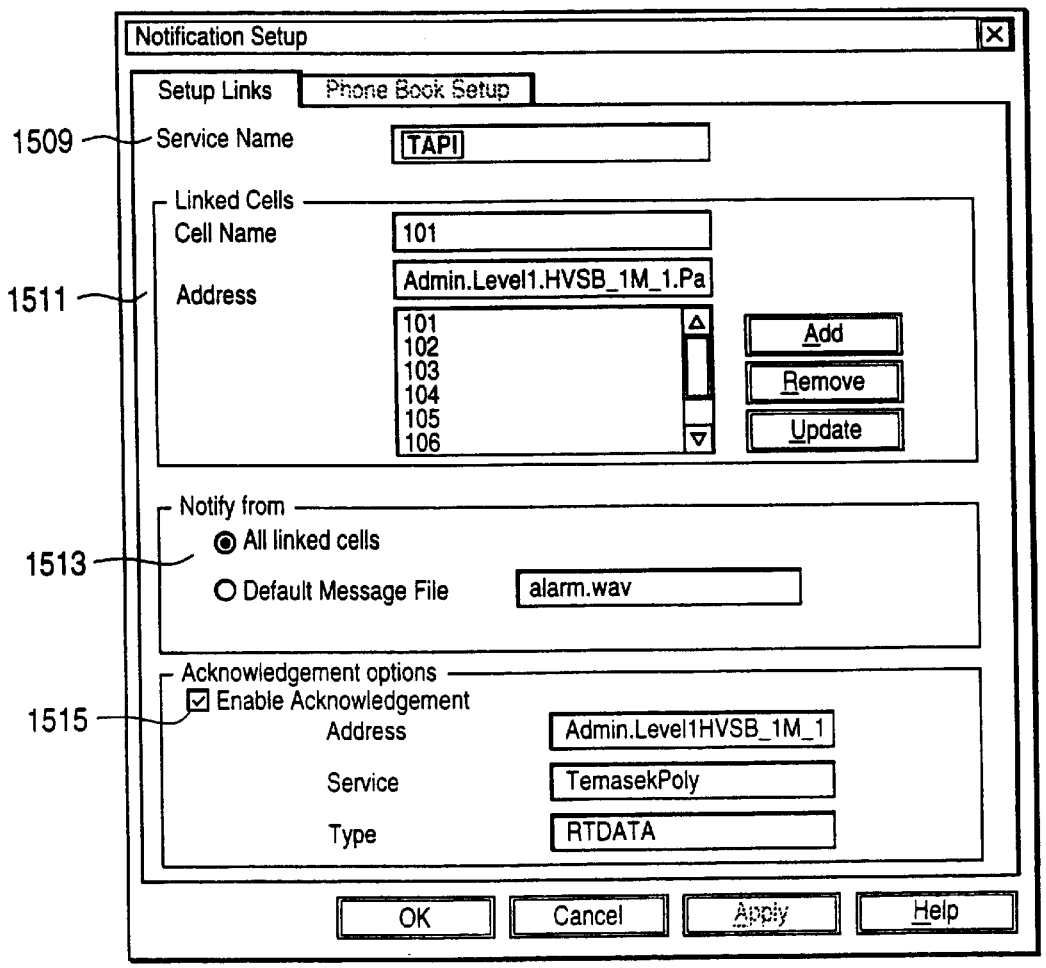
Figure 15C:
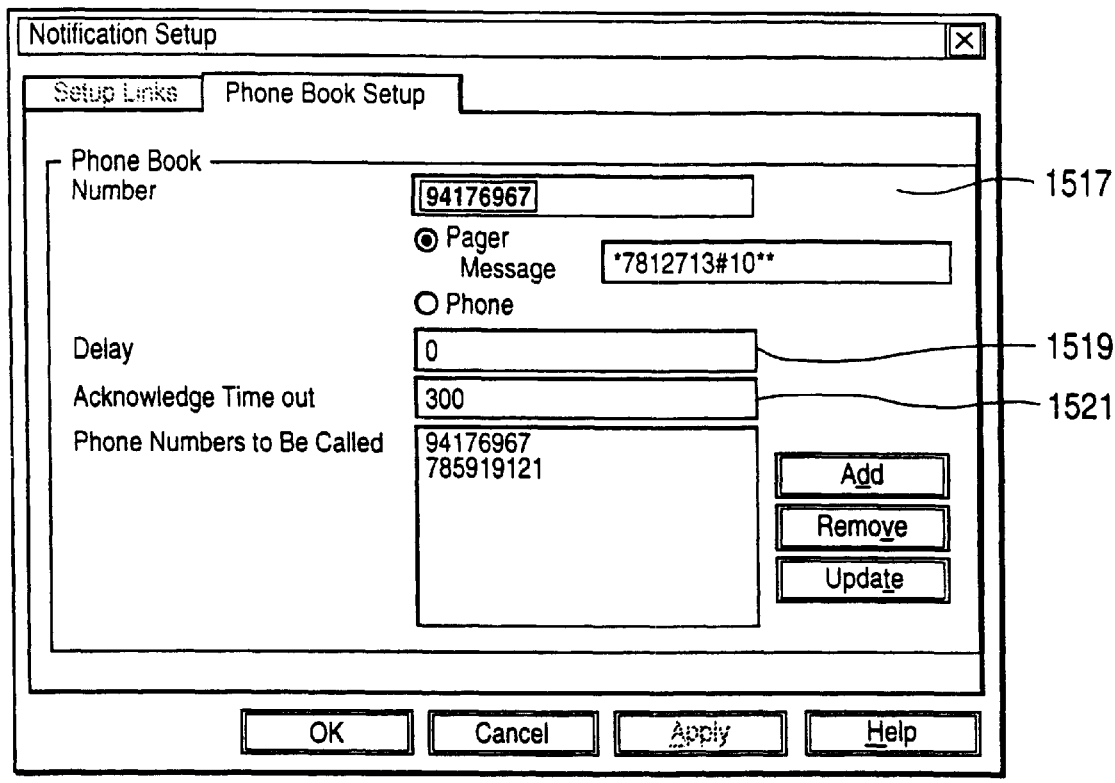

FIGS. 15*a*, 15*b*, and 15*c* illustrate user interfaces of application cells for defining event driven automation for notification of a user of an alarm condition. In FIG. 15*a*, the user defines, via service 1501, the object server, and via 1503 the data object which provides the input data to be monitored, and via bounds 1507 defines the valid range of input data. The user can define a sound file to play if the alarm is triggered via 1505. In FIG. 15*b*, the user defines the parameters of a notification cell which operates to notify a user of an alarm condition. In 1501 the user defines a target service 1509, here a telephony interface TAPI which will be accessed in response to the alarm condition. In 1511 the user defines the name of the alarm cell which will provide the alarm condition, as specified above, upon which the notification will occur. In 1513, the user defines the notification to be provided to the recipient (whether the alarm message specified in the linked cells, or a particular sound file). In 1515 the user defines an output data object 400 to write to as part of the notification. In FIG. 15*c*, under the phonebook setup tab the user defines 1517 telephone numbers of various persons to dial when the alarm condition is met and the notification occurs, and a delay 1519 between calling different numbers, if no acknowledgment is received for the specified number of seconds 1521. The notification cell will cause the specified telephone numbers to be dialed, and will play either the alarm wave file specified at 1505, or a default message file specified at 1513. In this manner the system can automatically notify any number of users directly by telephone or pager when an alarm condition is detected by a personalized SCADA application.

Example System Application

Figure 16:
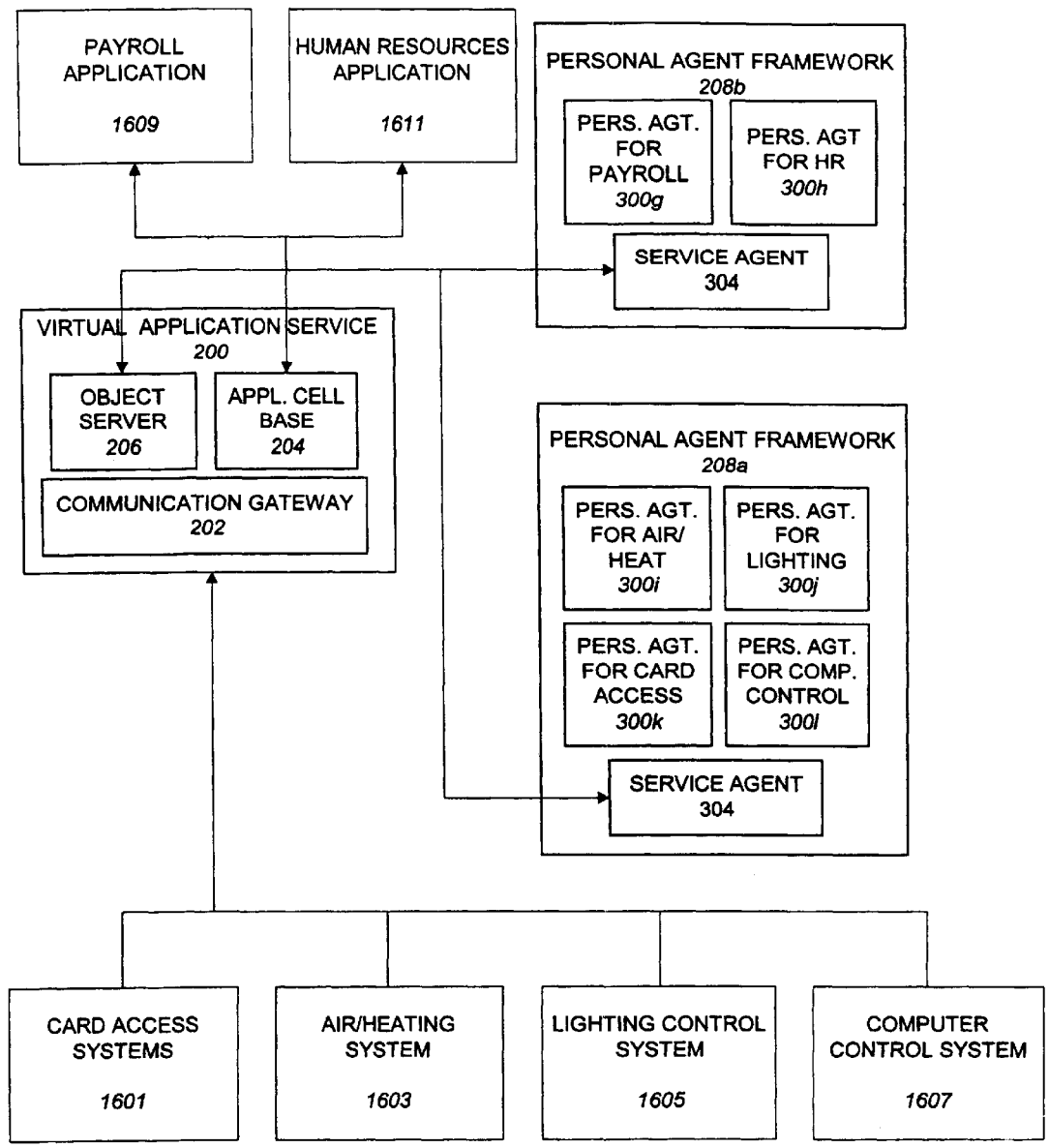
FIG. 16 is an illustration of a SCADA system integrating different applications in accordance with the present invention for an enterprise-wide real time management system.

Referring to FIG. 16 there is illustrated an example system design of a personalized SCADA system 1600 constructed using the present invention for providing integration between building management systems and legacy applications. In this system design the field devices 218 and control applications 220 comprise a card access system 1601, an air conditioning and heating system 1603, a lighting control system 1605, a computer control systems 1607. The system further includes legacy applications, such as a payroll application 1609 and a human resources application 1611 which calculate and manage information related to employee wages and performance information. Payroll application 1609 and human resource application 1611 may be object oriented legacy applications, whereas the lighting, computer, card access, and heating systems are designed in non-object oriented systems.

The card access system 1601 includes ID card readers at selected entry and exits points (e.g. outer doors, elevators, stairwells) which read ID badges issued to employees and control access to the building and its interiors. The card access system 1601 tracks the identity, location, and time of each employee passing through a controlled entry. This information is passed from the card access system 1601 through the communications gateway 202 to be stored in an object server 206, after processing and context mapping (e.g. door or elevator ID, floor, room number) by various application cells 204. The object server 206 includes data objects defining both field devices such as entry points in the building, but also data objects defining individual employees as used by the legacy applications.

The lighting control system 1605 manages lights in individual employee offices and workspaces. The air conditioning and heating system 1603 manages heating and cooling of the building, including controls for heating or cooling individual floors or offices. The computer control systems 1607 controls access to computers. The systems also provide real time data to the communications gateway 202, and to application cells 204 which create derived real time data and map such data onto various data objects in the object server 206.

The various applications and systems are monitored and controlled by two personal agent frameworks 208*a*, 208*b* on different remote computers. Personal agent framework 208*a* provides personal agents 300*i*, 300*j*, 300*k*, 300*l* for monitoring and controlling the air conditioning, lighting, card access, and computer control systems, respectively. Personal agent framework 208*b* provides personal agents 300*g*, 300*h* for monitoring the payroll and human resources applications, respectively. Each of these personal agent frameworks contain service agents 304 which subscribe to a single object server 206, which contains data objects 400 representative of entities used by the various systems. Thus, the object server 206 includes data objects for employees, departments, wages, and the like for the payroll and human resources applications, data objects for floors, rooms, lights, temperature gauzes, elevators, water systems, computers, and the like for the various control systems, providing an integrated data model for both the building management applications and the legacy applications.

In operation, when an employee enters or leaves the building, this information is received from the card access system 1601 into the object server 206 and updated in respective data objects 400 representing individual employees. This information is then available for any of the other systems and applications for processing.

For example, when an employee enters the building, the card access system 1601 detects the entry, and updates an employee data object 400 (or other similar data object) to indicate the presence of the employee. The payroll application 1609 uses this information to calculate hourly wages for the employee; the human resources application 1611 reads this information, to maintain historical data regarding employee attendance for use in an employee performance review. Also, if the employee is particularly late to work, a notification operation is triggered in a personal agent 300 and the employee's supervisor is alerted on their own computer.

Also, the lighting control system 1607 reads the updated employee data object in the object server 206 and automatically turns on lights in the employee's office, and floor if necessary. The air conditioning and heating system 1603 takes appropriate heating or cooling actions to obtain a desired working temperature in the employee's office or work area. The computer control systems 1607 responds to the employee's entry by automatically booting their computer.

Likewise, when the employee leaves the building, this information is updated by the card access system 1601 to the object server 206 and made available to the other systems. The lighting control system 1607 turns off lights in the employee's office. When the air conditioning and heating system 1603 determines that an employee has left the building, a timed and event conditioned automation operation is triggered to turn off heating or cooling in the employee's office if the employee does not re-enter the building within a specified amount of time. Similarly, the computer control systems 1607 automatically shuts down the employee's computer after a specified period of time. The payroll application 1609 updates payroll data for the employee.

This examples shows how the present invention provides a complete integration of the underlying physical facility and its control systems, with enterprise applications.

Security

As another feature of the present invention, there is provided a security mechanism which restricts which users of the system have the ability to update data objects 400 via the personal agents 300. The security mechanism operates by restricting write operations by the service agents 304 on the data objects 400, as follows:

The objects server 206 stores a list of groups, each group comprising a named list of users. Each leaf data object 400b has a data object mask, each bit position of which is associated with a particular one of the groups. In a preferred embodiment, there is a maximum of 32 groups, to correspond with a 32 bit data object mask. If a group has write permission to the leaf data object 400b, then its corresponding bit position is set in the data object mask.

When a user logs into the systems, the service agent 304 in the user's personal agent framework 208 creates a 32 bit user mask which indicates each of the groups of which the user is member. The bit positions of the user mask correspond to the same groups as the bit positions of the data object mask. The user mask is created by traversing each group in the object server 206 and setting the corresponding bit position in the user mask for the group if the user is included in the list.

When a service agent 304 for a user attempts to write to a leaf data object 400b, it checks the allowed groups for the data object 400b against the groups to which the user belongs. This is done by ANDing the user mask with data object mask. If the result is non-zero, then the user has write access to the data object. The advantage of this method is that the user mask is created when the user logs in, and is consequently immediately available to the service agent 304.

Concurrency Control

Another feature of the present invention is concurrency control. Since the service agents 304 and the application cells 204 can both read and write to the data objects 400 asynchronously, there is a need for concurrency control. In the present invention, this is provided by a global locking mechanism in each virtual application service 200 which controls all service agents proxies 304S within the virtual application service 200. This approach is desired since the object server 206 is not itself a process, and has no direct mechanism for controlling access to its data objects.

For reading data, no locking of data objects is necessary. A shared memory is used for the data store to allows multiple processes to read data simultaneously. However, the virtual application service 200 restricts data write operations to one process at a time in order to maintain the integrity of the data object that may be represented by more than one element in the object server 206. For example, a data object holding a time value may physically store the hours portion in a separate, non-contiguous location from the seconds portion; locking of the entire data object thus preserve both its logical and physical integrity.

For writing, a global locking object is shared by all service agents. Each object server 206 has a locking parameter. A service agent 304 locks the particular object server 206 before it performs write command. If the object server 206 is already locked by another process, the service agent 304 waits for 100 ms for other process to release the lock, and then re-attempts the write.

Scalability

A desirable SCADA system should be scaleable to provide access by a large number of remote users having their own personal agent frameworks 208. Thus, any virtual application service 200 in a host computer needs to be able to support an arbitrarily large number of connections to such remote computers. However, it is simply a fact that any computer has a limited number of open network connections through which the service agents 304 on remote computers can communicate with an object server 206 on a host computer.

A separate issue in scalability is quality of service in terms of real time responsiveness. Conventionally, as the number of network connections increases, the quality of service decreases due to an increased response time. The present invention provides an architecture that makes these issues independently controllable, and thus enables a fixed level of quality of service while supporting an unlimited number of remote users.

With respect to supporting an unlimited number of remote users, an object server 206 is replicated, in the manner described above with respect to FIG. 7, onto each of the remote computers that have presentation agents 302 which subscribe to the object server 206. In this manner, a remote computer can subscribe to any number of host computers containing different object servers 206 and data objects 400. In addition, when an object server 206 is replicated, it is only necessary to replicate on a remote computer the data objects 400 of the object server 206 which are subscribed to by that remote computer.

Figure 17:
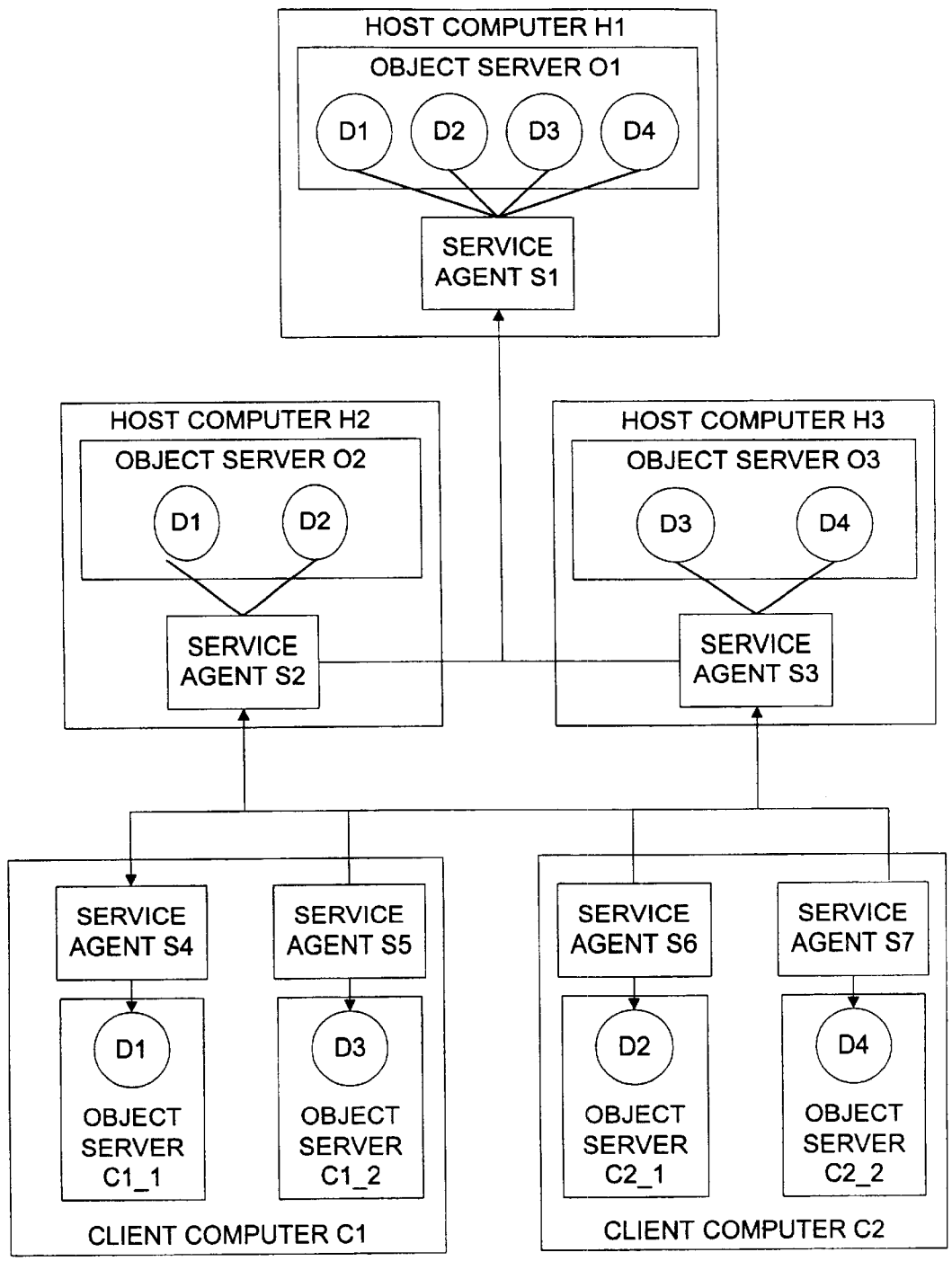
FIG. 17 is an illustration of replication of the object server in multiple host environments.

Further, host computers can subscribe to each other, and provide for hierarchical replication. Referring to FIG. 17, there is shown an illustration of this arrangement, a first host computer H1 with a first object server O1 contains four data objects D1, D2, D3 and D4. Service agent S1 provides access to these data objects.

Second host computer H2 has an object server O2 and service agent S2, which subscribes to data objects D1 and D2 to update such objects in object server O2.

Third host computer H3 has an object server O3 and a service agent S3, which subscribes to data objects D3 and D4 to update such objects in object server O3. Object servers O2 and O3 are replications of selected data objects of object server O1. Service agents S2 and S3 are linking service agents, since they link the original host computer H1 with the client computers C1 and C2. Client computers C1 and C2 also contain replicated portions of object server O1, but for different data objects in different object servers.

Client computer C1 has object server C1_1 which contains data object D1, and object server C1_2 which contains data object D3. These object servers are each respectively serviced by service agents S4 and S5. Client computer C2 has object server C2_1 which contains data object D2 and object server C2_2 which contains data object D4. These object servers are each respectively serviced by service agents S6 and S7. Separation of the various data objects in multiple object servers on the client computers maintains the addressing scheme described above, while providing for any number of client computers to subscribe to the same data objects from various host computers.

To create a replicated object server for various types of distributed arrangements, the user copies a configuration file of the object server 206 from a first host computer to a second host computer, and launches the object server in the second host computer. Then the service agent from the first host computer is associated with the service agent of the second host computer, such as by a drag and drop operation as described above with respect to FIG. 9. Associating the service agents in this manner copies the network address of the host computer (e.g. IP address, and port location) in the network address property of service agent of the second host.

When this process is initiated, all of the data objects from the first object server are duplicated into the second object server. To ensure that the second host object server provide a replication of the data objects for addressing purposes, the service agent on the second host computer queries the first host's service agent to determine all of the data objects that available in the first host by sending an object name and internal address of the data object within the second object server as a relative offset in memory from a base address of the object server. The host replies with its offset for this object. The second service agent then updates the object server index tables with the correct internal address. The user may then delete any unnecessary data objects.

In a distributed host arrangement, the monitoring, notification, and control operations are similar as before. When an object server 206 is updated with changed data (whether from an application cell during monitoring or notification, or by a service agent during control) the service agent proxies 304S notify their service agents of the changed data. For a service agent which links two host computers, this linking service agent propagates the notification to its client service agent. The client service agent then updates its local object server or replicated object store 209.

The issue of quality of service is now independently addressable from the issue of feasible connections. This is because each service agent 304 updates its local object server 206 immediately when requested by a local presentation cell, and then separately updates an object server 206 on a host computer. There is no interprocess communication between different computers, only data communication by updating the data objects. The client service agent 304 does not have to pend on another service agent 304 in the host computer to respond. Rather, each service agent 304 will have its own predefined quality service parameters, and the removal of interprocess dependencies means that these quality of service parameters can be guaranteed.

A related issue to quality of service is the resolution of data being updated. Generally, quality of service is impacted by the granularity of the data to be updated between different objects and process. For example, there may be significant quality of service impact if a host computer has to update a client computer for each 0.1 degree change in a temperature, as compared to updating only for a 10 change. This quality of service issue is addressed within the application cells and presentation cells. These cells have a user definable resolution value which is the threshold by which the application cell will update a service agent. For example, if the output resolution is 20 degrees on a 0–100 scale, the application cell 204 will not update the object server 206 until there is this much change in the data. This is minimum delta in the current value that is required prior to updating the object server 206.

Accordingly, there has been described a framework for the creation and user of personalized SCADA applications that provide quality of service guarantees, scalability, and integration of control systems and legacy applications into a unified data model.

APPENDIX A

This appendix lists the method interfaces of the service agent, presentation cells, and application cells.

Service Agent Methods

OnCreate( ): Called by the personal agent framework just after the memory allocation for the object. Initializes private data members and counters, if any.

Activate( ): Called by the framework to indicate the start of the subscription service by the service agent. When a service agent is activated, it is available to receive notifications from other cells for requests or updates to data objects.

PreActivate( ): Called by the personal agent framework before Activate is called for any cleaning up work, including initializing containers such as linked lists and stacks created for operational purposes. Restores initial values for display parameters.

Deactivate( ): Indicates the end of the service. Service agent does not receive requests while deactivated.

OnGetName( ): Called by the personal agent framework when another object requests the name of the service agent by reference. Returns the user-defined name of the service agent.

Update(flags): Called to update on events. Flags indicate the event. The following flags are used:

Periodical update flag;
New user has logged in;
System status changed—running/standby;
Edit command status of GUI changed—edit/operate.

OnDestroy( ): Called by the personal agent framework just before the object being destroyed, to carry out clean up work as described above, and release any links created with other objects.

OnInvokeMethod(From, MethodID, parameter list): Called by the personal agent framework as another object calls a user-defined method in the form of InvokeMethod (To, MethodID, para . . . ). This function enables developers to implement additional interfaces between new application components, and existing ones.

Serialize( ): Store parameters to or load parameters from an archive. This is used to store cell and agent properties set by the user.

Methods of Presentation Cells and Application Cells

Presentation cells and application cells share the same methods, with the primary difference being in their uses within the personal agent framework and virtual application services.

OnCreate( ): Same as in service agent.

OnInvalidateReference(Ref): Called by personal agent framework to indicate the object defined by the Ref is being destroyed or out of service.

Update(flags): Same as in service agent.

OnResize(newSize, oldSize): Updates the size of the graphical presentation of the cell to newSize. The oldSize value is stored to allow immediate resizing.

OnMove(offset): Moves the graphical presentation of the cell by the offset value.

OnDraw( ): Request to redraw the cell. This is called to update the graphical presentation of the cell.

Serialize( ): Same as in service agent.

OnInvokeMethod( ): Same as in service agent.

OnMouseEvent( ): Called by the personal agent framework to indicate mouse activities related to the dell.

Activate( ), PreActivate( ), and Deactivate( ): Same as in service agent.

OnNewLink( ): Called by the personal agent framework when a user drops an association with another cell onto the current cell. This updates the input channel address of the cell with the name of the cell that was dropped on it. This establishes the input/output relationship of the cells to each other.

IsLinkAccepted( ): Called by personal agent framework to inquire the new association being dropped on the cell is compatible with the cell type. This method passes a parameter that contains the type of the link. The type is defined within the virtual application service 200. If cell supports this type of data structure, it returns true. The personal agent framework 208 changes the cursor to a "drop allowed" symbol, allowing the user to drop the association on the cell, and thereby capture its address. If so, the personal agent framework calls OnNewLink to Cell. If IsLinkAcceped( ) returns false, user cannot drop the link as it is indicated by the cursor symbol.

OnGetName( ): Same as in service agent.

OnDragOut( ): Called by personal agent framework to inform the cell that user is trying to drag out a link from the cell. When the cell is dropped, this method updates the cell's output channel binding to the name of the object on which the cell was dropped by the user.

Data Exchange Methods Common to both Service Agents and Presentation/Application Cells OnCreateLink(Ref): Informed by personal agent framework that a new link is being created by object Ref.

OnReleaseLink(Ref): Informed by the personal agent framework that the link created by Ref is being released.

OnInvalidateLink(Ref): Informed by the personal agent framework that link created by Ref cannot be used.

OnNotify(Link): Called by the personal agent framework to inform the cell that data in the source Link has been changed. The cell then calls GetData( ) to the link to receive new data. This is a result of NotifyAllLinks( ) command from the source object.

GetData(parameterID, bucket_for_data), SetData (parameterlD, newData): Data exchange functions called by another object. Parameter ID is used only in cases where a presentation cell supports more than one parameter. Bucket_for_data is an allocated memory buffer for the presentation cell to copy data into.

Methods Exposed by the Personal Agent Framework

NotifyAllLinks( ): The personal agent framework allows presentation cells and service agents to maintain links to each other for notification of events. These links are maintained by the personal agent framework in order to reduce the complexity for the component developer. A cell or personal agent may create and remove (see next entries) these links at any time, and can request the personal agent framework to notify all other cells or agents that have created links to it. NotifyAllLinks( ) accepts two parameters, notification ID and 32 bit parameter of notification data. The personal agent framework then calls OnNotify of the recipient and passes these two parameters along with sender's reference.

The notification ID includes: NEW_DATA (indicates that there is new data pending for GetData function) and INVALIDATE_DATA (indicates that source data is invalid, blocking a call to GetData( )). This mechanism allows a component developer to create and maintain their own notifications.

CreateLink(Ref), ReleaseLink(Ref), ReleaseAllLinks( ): Called by a cell or agent to request a new link or release an existing link to another cell or agent identified by Ref.

InvokeMethod(Target, Method, parameter list): Called by both service agent and cell to invoke programmer-defined methods. Target is the name of a presentation cell or service agent; method is a method of the target; parameter list is list of data values. Provides a type-safe mechanism for invoking the cell. An object can call this function without verifying the existence of the target object. The personal agent framework returns false if the target object cannot be located.

GetName(Ref): Called by both service agent and cells, returns the used defined name of the object referenced.

GetReference(ObjectName): Called by both service agent and cells, returns a handle to the named object.

Invalidate( ): Called by cell to inform that the cell needs a redraw; initiates a redrawing of the cell on the display by the operating system.

APPENDIX B BACKGROUND CELLS

| | Bitmap |
|---|---|
|  | Adds an inactive bitmap to the current View Agent Window. |
| Cell Type | Not Applicable |
| Cell Path | Background → Bitmap |
| General... | Border |

Introduces a border of configurable width around the cell.
No Border - Displays cell with no border
Style Flat - Displays cell within a light gray border.
Raised - Cell is enclosed by a light gray raised border.
If the Frame option is checked the border will appear raised relative to the body of the cell
Sunken - Cell is enclosed by a light gray sunken border of default width 1. If the Frame option is -continued

| | Bitmap |
|---|---|
|  | Adds an inactive bitmap to the current View Agent Window. |
| | checked the body of the cell will appear raised relative to the border.<br>Frame - Changes the border appearance to look three dimensional.<br>Width - Assigns the width of the border. (Default width - 1) |
| Options... | Import - Selects bitmap to be displayed in the background.<br>Disable Resize - Disables altering the current size of the cell. |

Sample Configurations

| Default Border No Border | Border Raised Frame✘ | Border Sunken Frame✘ | Border Raised Frame ✓ | Border Sunken Frame ✓ |
|---|---|---|---|---|

| | Text |
|---|---|
| This is a Catseye Cell | Displays a passive, user-defined text string in the View Agent widow. |
| Cell Type | Not Applicable |
| Cell Path | Background → Text |
| General... | Border |
| | Introduces a border of configurable width around the cell.<br>No Border - Displays cell with no border<br>Style<br>Flat - Displays cell within a light gray border.<br>Raised - Cell is enclosed by a light gray raised border. If the Frame option is checked the border will appear raised relative to the body of the cell<br>Sunken - Cell is enclosed by a light gray sunken border of default width 1. If the Frame option is checked the body of the cell will appear raised relative to the border.<br>Frame - Changes the border appearance to look three dimensional.<br>Width - Assigns the width of the border. (Default width - 1) |
| Options... | Background - Text<br>Caption - Text to be displayed.<br>Font - Text display font. All Windows 95 fonts are available. |

Sample Configurations

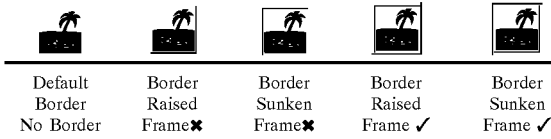

| This is a Catseye Cell | Pressure | Management | Catseye | Weight |
|---|---|---|---|---|
| Default Border No Border | Border Raised Frame✘ | Border Sunken Frame✘ | Border Raised Frame ✓ | Border Sunken Frame ✓ |

| | Button - Decrement |
|---|---|
|  | Allows user modification and control of a particular field object through the use of a decremental button. Modification of this field object can be temporarily controlled through an interlock mechanism. |
| Cell Type | Single object<br>Object data type: RTDATA |
| Cell Path | Control → Button → Decrement |
| General... | Bindings<br>Associates an object from a particular Object Server (or cell) with the selected cell. The selected cell will reflect the behavior of this object.<br>Input/Output Channel<br>Service - Name of the Object Server containing the associated object. A default name will appear in the event that the cell is associated with another cell.<br>Address - Address (path name within Object Server) of the associated object.<br>Interlock Channel<br>Service - Service which locks the operation of the control cell.<br>Address - Address of the cell which locks the operation of the control cell.<br>Clear - Clears the contents of the Service and Address static boxes, thus breaking the link between the cell and object.<br>Note: The red cross at the top right hand corner of the cell marks a cell which is currently unassociated.<br>Mapping<br>Maps the actual range of values, to a user-defined range.<br>Data Source - End points of the original range.<br>Display - End points of the displayed range.<br>Border<br>Introduces a border of configurable width around the cell.<br>No Border - Displays cell with no border<br>Style<br>Flat - Displays cell within a light gray border.<br>Raised - Cell is enclosed by a light gray raised border. If the Frame option is checked the border will appear raised relative to the body of the cell<br>Sunken - Cell is enclosed by a light gray sunken border. If the Frame option is checked the body of the cell will appear raised relative to the border.<br>Frame - Changes the border appearance to look three dimensional.<br>Width - Assigns the width of the border. (Default width - 1) |
| Options... | Decrement By - Assigns the decremental interval. (Default - 5) |

Sample Configurations

| Default Border No Border | Border Raised Frame✘ | Border Sunken Frame✘ | Border Raised Frame ✓ | Border Sunken Frame ✓ |
|---|---|---|---|---|

| | Button - Increment |
|---|---|
| | Allows user modification and control of a particular field object through the use of a incremental button. Modification of this field object can be temporarily |

-continued

| Button - Increment | |
|---|---|
| Cell Type | controlled through an interlock mechanism.<br>Single object<br>Object data type: RTDATA |
| Cell Path | Control → Button → increment |
| General... | Bindings<br>Associates an object from a particular Object Server (or cell) with the selected cell. The selected cell will reflect the behavior of this object.<br>Input/Output Channel<br>Service - Name of the Object Server containing the associated object. A default name will appear in the event that the cell is associated with another cell.<br>Address - Address (path name within Object Server) of the associated object.<br>Interlock Channel<br>Service - Service which locks the operation of the control cell.<br>Address - Address of the cell which locks the operation of the control cell.<br>Clear - Clears the contents of the Service and Address static boxes, thus breaking the link between the cell and object.<br>Note: The red cross at the top right hand corner of the cell marks a cell which is currently unassociated.<br>Mapping<br>Maps the actual range of values, to a user-defined range.<br>Data Source - End points of the original range.<br>Display - End points of the displayed range.<br>Border<br>Introduces a border of configurable width around the cell.<br>No Border - Displays cell with no border<br>Style<br>Flat - Displays cell within a light gray border.<br>Raised - Cell is enclosed by a light gray raised border. If the Frame option is checked the border will appear raised relative to the body of the cell<br>Sunken - Cell is enclosed by a light gray sunken border. If the Frame option is checked the body of the cell will appear raised relative to the border.<br>Frame - Changes the border appearance to look three dimensional.<br>Width - Assigns the width of the border. (Default width - 1) |
| Options... | Increment By - Assigns the incremental interval. (Default - 5) |

Sample Configurations

| ✖ | ✖ | ✖ | ✖ | ✖ |
|---|---|---|---|---|
| Default<br>Border<br>No Border | Border<br>Raised<br>Frame✖ | Border<br>Sunken<br>Frame✖ | Border<br>Raised<br>Frame ✓ | Border<br>Sunken<br>Frame ✓ |

| Button - Pulse | |
|---|---|
| ✖ | Allows user modification and control of a particular field object through the use of a button. Upon depression of the button, the numeric value 1 will be assigned to the given object. The value zero will be assigned to the object after the button is released. Modification of this field object can be temporarily controlled through an interlock |

-continued

| Button - Pulse | |
|---|---|
| Cell Type | mechanism.<br>Single object<br>Object data type: RTDATA |
| Cell Path | Control → Button → Pulse |
| General... | Bindings<br>Associates an object from a particular Object Server (or cell) with the selected cell. The selected cell will reflect the behavior of this object.<br>Input/Output Channel<br>Service - Name of the Object Server containing the associated object. A default name will appear in the event that the cell is associated with another cell.<br>Address - Address (path name within Object Server) of the associated object.<br>Interlock Channel<br>Service - Service which locks the operation of the control cell.<br>Address - Address of the cell which locks the operation of the control cell.<br>Clear - Clears the contents of the Service and Address static boxes, thus breaking the link between the cell and object.<br>Note: The red cross at the top right hand corner of the cell marks a cell which is currently unassociated.<br>Mapping<br>Maps the actual range of values, to a user-defined range.<br>Data Source - End points of the original range.<br>Display - End points of the displayed range.<br>Border<br>Introduces a border of configurable width around the cell.<br>No Border - Displays cell with no border<br>Style<br>Flat - Displays cell within a light gray border.<br>Raised - Cell is enclosed by a light gray raised border. If the Frame option is checked the border will appear raised relative to the body of the cell<br>Sunken - Cell is enclosed by a light gray sunken border. If the Frame option is checked the body of the cell will appear raised relative to the border.<br>Frame - Changes the border appearance to look three dimensional.<br>Width - Assigns the width of the border. (Default width - 1) |
| Options... | Not Applicable |

Sample Configurations

| ✖ | ✖ | ✖ | ✖ | ✖ |
|---|---|---|---|---|
| Default<br>Border<br>No Border | Border<br>Raised<br>Frame✖ | Border<br>Sunken<br>Frame✖ | Border<br>Raised<br>Frame ✓ | Border<br>Sunken<br>Frame ✓ |

| Button - Toggle | |
|---|---|
| ✖ | Allows user modification and control of a particular field object through the use of a toggle button. When depressed this button allows alternation of an object value between zero and a user specified value. Modification of this field object can be temporarily controlled through an interlock mechanism. |
| Cell Type | Single object |

Button - Toggle

| | |
|---|---|
| Cell Path | Object data type: RTDATA |
| General... | Control → Button → Increment |
| | Bindings |
| | Associates an object from a particular Object Server (or cell) with the selected cell. The selected cell will reflect the behavior of this object. |
| | Input/Output Channel |
| | Service - Name of the Object Server containing the associated object. A default name will appear in the event that the cell is associated with another cell. |
| | Address - Address (path name within Object Server) of the associated object. |
| | Interlock Channel |
| | Service - Service which locks the operation of the control cell. |
| | Address - Address of the cell which locks the operation of the control cell. |
| | Clear - Clears the Contents of the Service and Address static boxes, thus breaking the link between the cell and object. |
| | Note: The red cross at the top right hand corner of the cell marks a cell which is currently unassociated. |
| | Mapping |
| | Maps the actual range of values, to a user-defined range. |
| | Data Source - End points of the original range. |
| | Display - End points of the displayed range. |
| | Border |
| | Introduces a border of configurable width around the cell. |
| | No Border - Displays cell with no border |
| | Style |
| | Flat - Displays cell within a light gray border. |
| | Raised - Cell is enclosed by a light gray raised border. If the Frame option is checked the border will appear raised relative to the body of the cell |
| | Sunken - Cell is enclosed by a light gray sunken border. If the Frame option is checked the body of the cell will appear raised relative to the border. |
| | Frame - Changes the border appearance to look three dimensional. |
| | Width - Assigns the width of the border. (Default width - 1) |
| Options... | Not Applicable |

Sample Configurations

| | | | | |
|---|---|---|---|---|
| ✱ | ✱ | ✱ | ✱ | ✱ |
| Default | Border | Border | Border | Border |
| Border | Raised | Sunken | Raised | Sunken |
| No Border | Frame✘ | Frame✘ | Frame✓ | Frame✓ |

Numeric

| | |
|---|---|
| 00.00ˣ | Allows monitoring, user modification and control of a particular field object. Double clicking the cell at runtime, enables modification of the field object. Modification of this field object can be temporarily controlled through an interlock mechanism. |
| Cell Type | Single Object |
| | Object data type: RTDATA |
| Cell Path | Control → Numeric |
| General... | Bindings |
| | Associates an object from a particular Object Server (or cell) with the selected cell. The selected cell will reflect the behavior of this object. |
| | Input/Output Channel |
| | Service - Name of the Object Server containing the associated object. A default name will appear in the event that the cell is associated with another cell. |
| | Address - Address (path name within Object Server) of the associated object. |
| | Interlock Channel |
| | Service - Service which locks the operation of the control cell. |
| | Address - Address of the cell which locks the operation of the control cell. |
| | Clear - Clears the contents of the Service and Address static boxes, thus breaking the link between the cell and object. |
| | Note: The red cross at the top right hand corner of the cell marks a cell which is currently unassociated. |
| | Mapping |
| | Maps the actual range of values, to a user-defined range. |
| | Data Source - End points of the original range. |
| | Display - End points of the displayed range. |
| | Border |
| | Introduces a border of configurable width around the cell. |
| | No Border - Displays cell with no border |
| | Style |
| | Flat - Displays cell within a light gray border. |
| | Raised - Cell is enclosed by a light gray raised border. If the Frame option is checked the border will appear raised relative to the body of the cell |
| | Sunken - Cell is enclosed by a light gray sunken border. If the Frame option is checked the body of the cell will appear raised relative to the border. |
| | Frame - Changes the border appearance to look three dimensional. |
| | Width - Assigned the width of the border. (Default width - 1) |
| Options... | Control - Numeric |
| | Display - Assigns a format for the display value. |
| | Font - All windows fonts are available. |
| | Right justify - Enables right justification of display. |

Sample Configurations

| | | | | |
|---|---|---|---|---|
| 00.00ˣ | 000.00✱ | 00.000✱ | | 0000.0✱ |
| Default | Border | Border | Border | Border |
| Border | Raised | Sunken | Raised | Sunken |
| No Border | Frame✘ | Frame✘ | Frame✓ | Frame✓ |

Slider

| | |
|---|---|
| | Allows user modification and control of a particular field object through the use of a Slider. Modification of this field object can be temporarily ceased by locking this control cell, using an interlock mechanism. |
| Cell Type | Single object |
| | Object data type: RTDATA |
| Cell Path | Control → Slider |
| General... | Bindings |

-continued

 Slider
Allows user modification and control of a particular field object through the use of a Slider. Modification of this field object can be temporarily ceased by locking this control cell, using an interlock mechanism.

Associates an object from a particular Object Server (or cell) with the selected cell. The selected cell will reflect the behavior of this object.
Input/Output Channel Service - Name of the Object Server containing the associated object. A default name will appear in the event that the cell is associated with another cell.
Address - Address (path name within Object Server) of the associated object.
Interlock Channel Service - Service which locks the operation of the control cell.
Address - Address of the cell which locks the operation of the control cell.
Clear - Clears the contents of the Service and Address static boxes, thus breaking the link between the cell and object.
Note: The red cross at the top right hand corner of the cell marks a cell which is currently unassociated.
Mapping Maps the actual range of values, to a user-defined range.
Data Source - End points of the original range.
Display - End points of the displayed range.
Border Introduces a border of configurable width around the cell.
No Border - Displays cell with no border
Style Flat - Displays cell within a light gray border.
Raised - Cell is enclosed by a light gray raised border. If the Frame option is checked the border will appear raised relative to the body of the cell
Sunken - Cell is enclosed by a light gray sunken border. If the Frame option is checked the body of the cell will appear raised relative to the border.
Frame - Changes the border appearance to look three dimensional.
Width - Assigns the width of the border. (Default width – 1)

Options... Control - Slider
Button Thickness - Assigns a thickness for the slider button. (Default thickness – 15)
Disable Background - Does not display the background color of the slider.

| | 10 | 25 | 20 |
|---|---|---|---|
| | | Disable Background ✓ | |

 Pages
Allows the user to navigate from the current view Agent window to a pre specified View Agent window.

Cell Type  Single object
Object data type: RTDATA, INTDATA, STATUS
Cell Path  Navigate → Pages
General...  Bindings Associates an object from a particular Object Server (or other cell) with the selected cell. The selected cell will reflect the behavior of this object.
Input Channel Service - Name of the Object Server containing the associated object. A default name will appear in the event that the cell is associated with another cell.
Address - Address (path name within Object Server) of the associated object.
Data Type - Type of data accepted by the object. The types of data accepted are RTDATA, INTDATA and STATUS.
Clear - Clears the contents of the Service and Address static boxes, thus breaking the link between the cell and object.
Note: The red cross at the top right hand corner of the cell marks a cell which is currently unassociated.
Border Introduces a border of configurable width around the cell.
No Border - Displays cell with no border
Style Flat - Displays cell within a light gray border.
Raised - Cell is enclosed by a light gray raised border. If the Frame option is checked the border will appear raised relative to the body of the cell
Sunken - Cell is enclosed by a light gray sunken border of default width 1. If the Frame option is checked the body of the cell will appear raised relative to the border.
Frame - Changes the border appearance to look three dimensional.
Width - Assigns the width of the border. (Default width – 1)

Options...  Select Page - Assigns the Vew Agent window that will be the destination.
Transparent - Enables transparent cell.

Sample Configurations

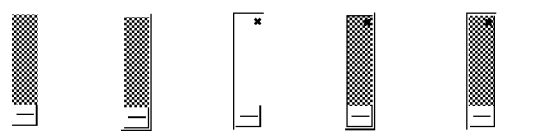

| Default Border No Border Button Thickness 15 | Border Raised Frame✘ Button Thickness | Border Sunken Frame✘ Button Thickness | Border Raised Frame ✓ Button Thickness 5 | Border Sunken Frame ✓ Button Thickness |

Sample Configurations

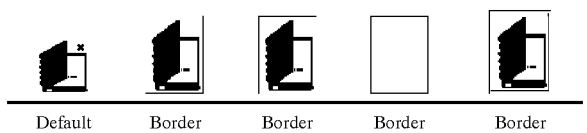

| Default Border No Border | Border Raised Frame✘ | Border Sunken Frame✘ | Border Raised Frame ✓ Transparent ✓ | Border Sunken Frame ✓ |

|  |  |
|---|---|
| | Bitmaps<br>Creates a motion picture from a series of two images, to reflect an object making a transition between two states. |
| Cell Type | Single Object<br>Object data type: RTDATA, INTDATA, STATUS |
| Cell Path | State Monitors → Bitmaps |
| General... | Bindings<br><br>Associates an object from a particular Object Server (or other cell) with the selected cell. The selected cell will reflect the behavior of this object.<br>Input Channel<br><br>Service - Name of the Object Server containing the associated object. A default name will appear in the event that the cell is associated with another cell.<br>Address - Address (path name within Object Server) of the associated object.<br>Data Type - Type of data accepted by the object. The types of data accepted are RTDATA, INTDATA and STATUS.<br>Clear - Clears the contents of the Service and Address static boxes, thus breaking the link between the cell and object.<br>Note: The red cross at the top right hand corner of the cell marks a cell which is currently unassociated.<br>Border<br><br>Introduces a border of configurable width around the cell.<br>No Border - Displays cell with no border<br>Style<br><br>Flat - Displays cell within a light gray border.<br>Raised - Cell is enclosed by a light gray raised border. If the Frame option is checked the border will appear raised relative to the body of the cell<br>Sunken - Cell is enclosed by a light gray sunken border of default width 1. If the Frame option is checked the body of the cell will appear raised relative to the border.<br>Frame - Changes the border appearance to look three dimensional.<br>Width - Assigns the width of the border. (Default width – 1)<br>Condition<br><br>Defines a state transition condition. Once the field object meets this condition, the visual appearance of the Cell will change.<br>Define State Transition -<br><br>Using Zero (Default state) - Select Normal and Alarmed states corresponding to the numeric value 0 and any other numeric value.<br>Using Threshold - Select a numeric value for the field which defines the boundary between the Normal and Alarmed state.<br>Using Range - Select a range of values which correspond to the Normal state. Values outside this range correspond to the Alarmed state.<br>Invert States - Inverts the definition of the default Normal and Alarmed states. |
| Options... | State Monitors - Bitmaps<br>Import Bitmap For<br><br>Normal State - Bitmap displayed during the Normal state.<br>Alarmed State - Bitmap displayed during the Alarmed state.<br>Disable Resize - Disables altering the current size of the cell. |

|  |  |
|---|---|
| | Ellipse<br><br>Displays an ellipse changing color to reflect an object making a transition between two states. |
| Cell Type | Single Object<br>Object data type: RTDATA, INTDATA, STATUS |
| Cell Path | State Monitors → Ellipse |
| General... | Bindings<br><br>Associates an object from a particular Object Server (or other cell) with the selected cell. The selected cell will reflect the behavior of this object.<br>Input Channel<br><br>Service - Name of the Object Server containing the associated object. A default name will appear in the event that the cell is associated with another cell.<br>Address - Address (path name within Object Server) of the associated object.<br>Data Type - Type of data accepted by the object. The types of data accepted are RTDATA, INTDATA and STATUS.<br>Clear - Clears the contents of the Service and Address static boxes, thus breaking the link between the cell and object.<br>Note: The red cross at the top right hand corner of the cell marks a cell which is currently unassociated.<br>Border<br><br>Introduces a border of configurable width around the cell.<br>No Border - Displays cell with no border<br>Style<br><br>Flat - Displays cell within a light gray border.<br>Raised - Cell is enclosed by a light gray raised border. If the Frame option is checked the border will appear raised relative to the body of the cell<br>Sunken - Cell is enclosed by a light gray sunken border of default width 1. If the Frame option is checked the body of the cell will appear raised relative to the border.<br>Frame - Changes the border appearance to look three dimensional.<br>Width - Assigns the width of the border. (Default width - 1)<br>Condition<br><br>Defines a state transition condition. Once the field object meets this condition, the visual appearance of the Cell will change.<br>Define State Transition -<br><br>Using Zero (Default state)- Select Normal and Alarmed states corresponding to the numeric value 0 and any other numeric value.<br>Using Threshold - Select a numeric value for the field which defines the boundary between the Normal and Alarmed states.<br>Using Range - Select a range of values which correspond to the Normal state. Values outside this range correspond to the Alarmed state.<br>Invert States - inverts the definition of the default Normal and Alarmed states. |
| Options... | State Monitors - Ellipse<br><br>Color<br><br>Normal State - Color during Normal state.<br>Alarmed State - Color during Alarmed state. |

| Sample Configurations | | | | |
|---|---|---|---|---|
| ● | N/A | N/A | N/A | N/A |
| Default Border No Border | Border Raised Frame✘ | Border Sunken Frame✘ | Border Raised Frame✓ | Border Sunken Frame✓ |

Rectangle

■ Displays a rectangle changing color to reflect an object making a transition between two states.

| Cell Type | Single Object Object data type: RTDATA, INTDATA, STATUS |
|---|---|
| Cell Path | State Monitors → Rectangle |
| General... | Bindings |

Associates an object from a particular Object Server (or other cell) with the selected cell. The selected cell will reflect the behavior of this object.
Input Channel Service - Name of the Object Server containing the associated object. A default name will appear in the event that the cell is associated with another cell.
Address - Address (path name within Object Server) of the associated object.
Data Type - Type of data accepted by the object. The types of data accepted are RTDATA, INTDATA and STATUS.
Clear - Clears the contents of the Service and Address static boxes, thus breaking the link between the cell and object.
Note: The red cross at the top right hand corner of the cell marks a cell which is currently unassociated.
Border Introduces a border of configurable width around the cell.
No Border - Displays cell with no border
Style Flat - Displays cell within a light gray border.
Raised - Cell is enclosed by a light gray raised border. If the Frame option is checked the border will appear raised relative to the body of the cell
Sunken - Cell is enclosed by a light gray sunken border of default width 1. If the Frame option is checked the body of the cell will appear raised relative to the border.
Frame - Changes the border appearance to look three dimensional.
Width - Assigns the width of the border. (Default width - 1)
Condition Defines a state transition condition. Once the field object meets this condition, the visual appearance of the Cell will change.
Define State Transition -

Using Zero (Default state)- Select Normal and Alarmed states corresponding to the numeric value 0 and any other numeric value.
Using Threshold - Select a numeric value for the field which defines the boundary between the Normal and Alarmed states.
Using Range - Select a range of values which correspond to the Normal state. Values outside this range correspond to the Alarmed state.
Invert States - inverts the definition of the default Normal and Alarmed states.

-continued

Rectangle

■ Displays a rectangle changing color to reflect an object making a transition between two states.

| Options... | State Monitors - Rectangle |
|---|---|
| | Color |

Normal State - Color during Normal state.
Alarmed State - Color during Alarmed state.

| Sample Configurations | | | | |
|---|---|---|---|---|
| Default Border No Border | Border Raised Frame✘ | Border Sunken Frame✘ | Border Raised Frame✓ | Border Sunken Frame✓ |

✜ Rotor
Displays a rotating fan to reflect an object making a transition between two states.

| Cell Type | Single Object Object data type: RTDATA, INTDATA, STATUS |
|---|---|
| Cell Path | State Monitors → Rotor |
| General... | Bindings |

Associates an object from a particular Object Server (or other cell) with the selected cell. The selected cell will reflect the behavior of this object.
Input Channel Service - Name of the Object Server containing the associated object. A default name will appear in the event that the cell is associated with another cell.
Address - Address (path name within Object Server) of the associated object..
Data Type - Type of data accepted by the object. The types of data accepted are RTDATA, INTDATA and STATUS.
Clear - Clears the contents of the Service and Address static boxes, thus breaking the link between the cell and object.
Note: The red cross at the top right hand corner of the cell marks a cell which is currently unassociated.
Border Introduces a border of configurable width around the cell.
No Border - Displays cell with no border
Style Flat - Displays cell within a light gray border.
Raised - Cell is enclosed by a light gray raised border. If the Frame option is checked the border will appear raised relative to the body of the cell
Sunken - Cell is enclosed by a light gray sunken border of default width 1. If the Frame option is checked the body of the cell will appear raised relative to the border.
Frame - Changes the border appearance to look three dimensional.
Width - Assigns the width of the border. (Default

| | |
|---|---|
| | Rotor |
| | Displays a rotating fan to reflect an object making a transition between two states. |
| | width - 1) |
| | Condition |
| | Defines a state transition condition. Once the field object meets this condition, the visual appearance of the Cell will change. |
| | Define State Transition - |
| | Using Zero (Default state) - Select Normal and Alarmed states corresponding to the numeric value 0 and any other numeric value. |
| | Using Threshold - Select a numeric value for the field which defines the boundary between the Normal and Alarmed states. |
| | Using Range - Select a range of values which correspond to the Normal state. Values outside this range correspond to the Alarmed state. |
| | Invert States - Inverts the definition of the default Normal and Alarmed states. |
| Options... | State Monitors - Rotor |
| | Number of segments - Number of rotating arms |
| | Interior Angle - Inner angle in degrees, of the rotating arm |
| | Rotation step - Speed of rotation in degrees, of an arm |
| | Color - Color of the rotating arms |
| | Anti-clockwise motion - Enables rotation in anti-clockwise direction |

Sample Configurations

| Default Border No Border No. of Segments: 4 Int. Angle: 40 | Border Raised Frame✗ No. of Segments: 7 Int. Angle: 40 | Border Sunken Frame✗ No. of Segments: 3 Int. Angle: 60 | Border Raised Frame ✓ No. of Segments: 10 Int. Angle: 10 | Border Sunken Frame ✓ No. of Segments: 6 Int. Angle: 20 |

| | Text |
|---|---|
| | Displays a change between text strings, to reflect an object making a transition between two states. |
| OFF* | |
| Cell Type | Single Object |
| | Object data type: RTDATA, INTDATA, STATUS |
| Cell Path | State Monitors → Text |
| General... | Bindings |
| | Associates an object from a particular Object Server (or other cell) with the selected cell. The selected cell will reflect the behavior of this object. |
| | Input Channel |
| | Service - Name of the Object Server containing the associated object. A default name will appear in the event that the cell is associated with another cell. |
| | Address - Address (path name within Object Server) of the associated object. |
| | Data Type - Type of data accepted by the object. The types of data accepted are RTDATA, |

| | Text |
|---|---|
| | Displays a change between text strings, to reflect an object making a transition between two states. |
| OFF* | |
| | INTDATA and STATUS. |
| | Clear - Clears the contents of the Service and Address static boxes, thus breaking the link between the cell and object. |
| | Note: The red cross at the top right hand corner of the cell marks a cell which is currently unassociated. |
| | Border |
| | Introduces a border of configurable width around the cell. |
| | No Border - Displays cell with no border |
| | Style |
| | Flat - Displays cell within a light gray border. |
| | Raised - Cell is enclosed by a light gray raised border. If the Frame option is checked the border will appear raised relative to the body of the cell |
| | Sunken - Cell is enclosed by a light gray sunken border of default width 1. If the Frame option is checked the body of the cell will appear raised relative to the border. |
| | Frame - Changes the border appearance to look three dimensional. |
| | Width - Assigns the width of the border. |
| | (Default width - 1) |
| | Condition |
| | Defines a state transition condition. Once the field object meets this condition, the visual appearance of the Cell will change. |
| | Define State Transition - |
| | Using Zero (Default state)- Select Normal and Alarmed states corresponding to the numeric value 0 and any other numeric value. |
| | Using Threshold - Select a numeric value for the field which defines the boundary between the Normal and Alarmed states. |
| | Using Range - Select a range of values which correspond to the Normal state. Values outside this range correspond to the Alarmed state. |
| | Invert States - inverts the definition of the default Normal and Alarmed states. |
| Options... | State Monitors - Text |
| | Caption |
| | Normal state - Text to be displayed during the Normal state |
| | Alarmed - Text to be displayed during the Active state. |

Sample Configurations

| OFF* | value* | Maximum* | Height* | Value* |
|---|---|---|---|---|
| Default Border No Border | Border Raised Frame✗ | Border Sunken Frame✗ | Border Raised Frame ✓ | Border Sunken Frame ✓ |

| | Numeric |
|---|---|
| 00.00* | A numerical display which will reflect the continuously changing value of a field object. |
| Cell Type | Single object<br>Object data type: RTDATA, INTDATA |
| Cell Path | Value monitors → Numeric |
| General... | Bindings<br><br>Associates an object from a particular Object Server (or other cell) with the selected cell. The selected cell will reflect the behavior of this object.<br>Input Channel<br><br>Service - Name of the Object Server containing the associated object. A default name will appear in the event that the cell is associated with another cell.<br>Address - Address (path name within Object Server) of the associated object.<br>Data Type - Type of data accepted by the object. The types of data accepted are RTDATA, INTDATA and STATUS.<br>Clear - Clears the contents of the Service and Address static boxes, thus breaking the link between the cell and object.<br>Note: The red cross at the top right hand corner of the cell marks a cell which is currently unassociated.<br>Mapping<br><br>Maps the actual range of values, to a user-defined range.<br>Data Source - End points of the original range.<br>Display - End points of the displayed range.<br>Border<br><br>Introduces a border of configurable width around the cell.<br>No Border - Displays cell with no border<br>Style<br><br>Flat - Displays cell within a light gray border.<br>Raised - Cell is enclosed by a light gray raised border. If the Frame option is checked the border will appear raised relative to the body of the cell<br>Sunken - Cell is enclosed by a light gray sunken border of default width 1. If the Frame option is checked the body of the cell will appear raised relative to the border.<br>Frame - Changes the border appearance to look three dimensional.<br>Width - Assigns the width of the border. (Default width - 1) |
| Options... | Display - Assigns a numerical format.<br>Font - All windows fonts are available.<br>Right justify - Enables numerical display to be right justified. |

| | Sample Configurations | | | |
|---|---|---|---|---|
| 00.00* | 000.00* | 00.000* | 0000* | 0000.0* |
| Default Border<br>No Border | Border<br>Raised<br>Frame✘ | Border<br>Sunken<br>Frame✘ | Border<br>Raised<br>Frame✓ | Border<br>Sunken<br>Frame✓ |

| | Level Indicator |
|---|---|
| | Rectangular indicator, which grows vertically to reflect the continuously changing value of a field object. |
| Cell Type | Single object<br>Object data type: RTDATA, INTDATA |
| Cell Path | Value monitors → Level Indicator |
| General... | Bindings<br><br>Associates an object from a particular Object Server (or other cell) with the selected cell. The selected cell will reflect the behavior of this object.<br>Input Channel<br><br>Service - Name of the Object Server containing the associated object. A default name will appear in the event that the cell is associated with another cell.<br>Address - Address (path name within Object Server) of the associated object..<br>Data Type - Type of data accepted by the object. The types of data accepted are RTDATA, INTDATA and STATUS.<br>Clear - Clears the contents of the Service and Address static boxes, thus breaking the link between the cell and object.<br>Note: The red cross at the top right hand corner of the cell marks a cell which is currently unassociated.<br>Mapping<br><br>Maps the actual range of values, to a user-defined range.<br>Data Source - End points of the original range.<br>Display - End points of the displayed range.<br>Border<br><br>Introduces a border of configurable width around the cell.<br>No Border - Displays cell with no border<br>Style<br><br>Flat - Displays cell within a light gray border.<br>Raised - Cell is enclosed by a light gray raised border. If the Frame option is checked the border will appear raised relative to the body of the cell<br>Sunken - Cell is enclosed by a light gray sunken border of default width 1. If the Frame option is checked the body of the cell will appear raised relative to the border.<br>Frame - Changes the border appearance to look three dimensional.<br>Width - Assigns the width of the border. (Default width - 1) |
| Options... | Color<br><br>Display - Color indicating the variation<br>Background - Background color of the level indicator<br>Transparent Background - Enables a transparent background. |

Sample Configurations

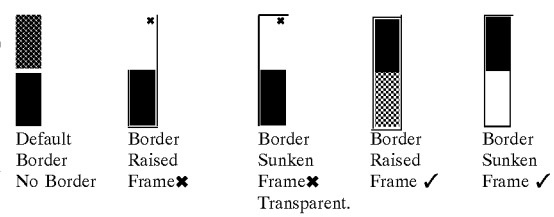

| Default Border<br>No Border | Border<br>Raised<br>Frame✘ | Border<br>Sunken<br>Frame✘<br>Transparent. | Border<br>Raised<br>Frame✓ | Border<br>Sunken<br>Frame✓ |
|---|---|---|---|---|

-continued

| Sample Configurations |
|---|
| Background |
| ✓ |

RTData → Status
Converts data of type RTData (Real Time Data) to data or type Status. The mapping is carried out according to a condition specified by the user.

Cell Type  Object data type: RTData[4], Status[4]
Cell Path  Mapping→RTData→Status
General...  Bindings Associates an object (from a particular Object Server) with the cell. The cell will reflect the behavior of this object.
Input Channel Service - Name of the Object Server or cell from which real time data is taken as input.
Address - Address (path name within Object Server) of the associated object.
Output Channel Service - Name of the Object Server or cell to which the status is written as output.
Address - Address (path name within Object Server) of the associated object.
Clear - Clears the contents of the Service and Address static boxes, thus breaking the link between the cell and object.
Note: The red cross at the top right hand side edge of the cell notifies the user of not linking the cell with an object.
Condition Defines a condition to map the data types. Once the field object meets this condition, the real time data type will be mapped to a status data type.
Define State Transition -

Using Zero (Default state) - Select Normal and Alarmed states corresponding to the numeric value 0 and any other numeric value.
Using Threshold - Select a numeric value for the field, which defines the boundary between the Normal and Alarmed states.
Using Range - Select a range of values, which correspond to the Normal state. Values outside this range correspond to the Alarmed state.
Invert States - Inverts the definition of the default Normal and Alarmed states.
Border Introduces a border with configurable width around the cell.
No Border - Displays cell with no border.
Style Flat - Displays cell within a light gray border.
Raised - Cell is enclosed by a light gray raised border. If the Frame option is checked the border will appear raised relative to the body of the cell.
Sunken - Cell is enclosed by a light gray sunken border. If the Frame option is checked the body of the cell will appear raised relative to the border.
Frame - Changes the border appearance to look three-dimensional.
Width - Assigns the width of the border.
(Default width - 1)

Options...  Not Applicable

| Sample Configurations | | | | |
|---|---|---|---|---|
|  |  |  |  |  |
| Default Border | Border Raised | Border Sunken | Border Raised | Border Sunken |
| No Border | Frame✘ | Frame✘ | Frame ✓ | Frame ✓ |

Status → RTData
Converts data of type Status to data of type RTData (Real Time Data). The mapping is carried out according to a condition specified by the user.

Cell Type  Object data type: RTData[4], Status[4]
Cell Path  Mapping → Status → RTData
General...  Bindings Associates an object (from a particular Object Server) with the cell. The cell will reflect the behavior of this object.
Input Channel Service - Name of the Object Server or cell from which status is taken as input.
Address - Address (path name within Object Server) of the associated object.
Output Channel Service - Name of the Object Server or cell to which the real time data is written as output.
Address - Address (path name within Object Server) of the associated object.
Clear - Clears the contents of the Service and Address static boxes, thus breaking the link between the cell and object.
Note: The red cross at the top right hand side edge of the cell notifies the user of not linking the cell with an object..
Mapping Defines two numerical values corresponding to the two states.
Status -

ON - Select a value corresponding to the ON state.
OFF - Select a value corresponding to the OFF state.
Border Introduces a border with configurable width around the cell.
No Border - Displays cell with no border.
Style Flat - Displays cell within a light gray border.
Raised - Cell is enclosed by a light gray raised border. If the Frame option is checked the border will appear raised relative to the body of the cell.
Sunken - Cell is enclosed by a light gray sunken border. If the Frame option is checked the body of the cell will appear raised relative to the border.
Frame - Changes the border appearance to look three-dimensional.
Width - Assigns the width of the border.
(Default width - 1)

Options...  Not Applicable

| | Sample Configurations | | | | | | Sample Configurations | | | | |
|---|---|---|---|---|---|---|---|---|---|---|---|
| |  |  |  |  |  | |  |  |  |  |  |
| | Default | Border | Border | Border | Border | | Default | Border | Border | Border | Border |
| | Border | Raised | Sunken | Raised | Sunken | | Border | Raised | Sunken | Raised | Sunken |
| | No Border | Frame✗ | Frame✗ | Frame ✓ | Frame ✓ | | No Border | Frame✗ | Frame✗ | Frame ✓ | Frame ✓ |

RTData → INTData
Converts data of type RTData (Real time data) to data of type INTData (Integer). The mapping is carried out according to a condition specified by the user.

Cell Type
Cell Path
General...

Object data type: RTData[4], INTData[4]
Mapping → RTData → INTData
Bindings

Associates an object (from a particular Object Server) with the cell. The cell will reflect the behavior of this object.
Input Channel Service - Name of the Object Server or cell from which real time data is taken as input.
Address - Address (path name within Object Server) of the associated object.
Output Channel Service - Name of the Object server or cell to which the Integer data is written as output.
Address - Address (path name within Object Server) of the associated object.
Clear - Clears the contents of the Service and Address static boxes, thus breaking the link between the cell and object.
Note: The red color cross at the top right hand side edge of the cell notifies the user of not linking the cell with an object.
Mapping Maps the actual range of values, to a user-defined range.
Data Source - Endpoints of the actual real time data range.
Display - Endpoints of the range mapped as integer values.
Border Introduces a border with configurable width around the cell.
No Border - Displays cell with no border.
Style Flat - Displays cell within a light gray border.
Raised - Cell is enclosed by a light gray raised border. If the Frame option is checked the border will appear raised relative to the body of the cell.
Sunken - Cell is enclosed by a light gray sunken border. If the Frame option is checked the body of the cell will appear raised relative to the border.
Frame - Changes the border appearance to look three-dimensional.
Width - Assigns the width of the border.
(Default width - 1)

Options... Not Applicable

INTData → RTData
Converts data of type INTData (Integer) to data of type RTData (Real time data). The mapping is carried out according to a condition specified by the user.

Cell Type
Cell Path
General...

Object data type: RTData, INTData
Mapping → INTData → RTData
Bindings

Associates an object (from a particular Object Server) with the cell. The cell will reflect the behavior of this object.
Input Channel Service - Name of the Object Server or cell from which real time data is taken as input.
Address - Address (path name within Object Server) of the associated object.
Output Channel Service - Name of the Object server or cell to which the Integer data is written as output.
Address - Address (path name within Object Server) of the associated object.
Clear - Clears the contents of the Service and Address static boxes, thus breaking the link between the cell and object.
Note: The red cross at the top right hand side edge of the cell notifies the user of not linking the cell with an object..
Mapping Maps the actual range of values, to a user-defined range.
Data Source - Endpoints of the actual Integer data range.
Display - Endpoints of the range mapped as real time values.
Border Introduces a border with configurable width around the cell.
No Border - Displays cell with no border.
Style Flat - Displays cell within a light gray border.
Raised - Cell is enclosed by a light gray raised border. If the Frame option is checked the border will appear raised relative to the body of the cell.
Sunken - Cell is enclosed by a light gray sunken border. If the Frame option is checked the body of the cell will appear raised relative to the border.
Frame - Changes the border appearance to look three-dimensional.
Width - Assigns the width of the border.
(Default width - 1)

Options... Not Applicable

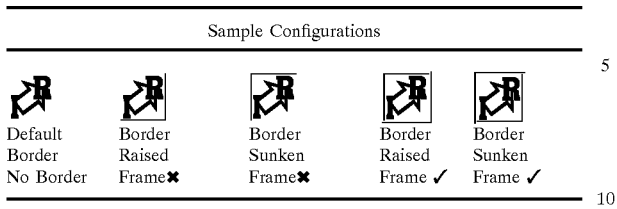

| Default Border No Border | Border Raised Frame✗ | Border Sunken Frame✗ | Border Raised Frame✓ | Border Sunken Frame✓ |

What is claimed is:

1. A computer implemented method for publishing supervisory and control data for managing distributed field devices that control or monitor physical or logical entities, the field devices having attributes representative of states of the entities, the method comprising:

receiving from the distributed field devices real time data formatted according to a communications protocol associated with each field device, such that real time data received from at least two field devices has different data formats;

converting the received real time data to standardized real time data in a standard data format independent of the field devices that specifies for each item of real time data a content and source of the real time data;

processing the standardized real time data to produce derived real time data;

storing in a central host computer the derived real time data in individual data objects in an object server, each data object having attributes corresponding to attributes of a field device; and publishing the derived real time data for the attributes of at least one data object to allow software processes executing on computers remote from the host computer to access the derived real time data.

2. The computer implemented method of claim 1, further comprising:

subscribing to the real-time data for the attributes of at least one data object;

receiving the real time data;

representing the real time data on at least one presentation cell;

responsive to a change in the published derived real time data, dynamically updating a representation of the change in the attributes of the field device by mapping the derived real time data to an output representation on at least one presentation cell.

3. A computer implemented supervisory control and data acquisition system for managing distributed field devices that control or monitor physical or logical entities, the field devices having attributes representative of states of the entities, the system comprising:

at least one virtual application service including:

a communications gateway communicatively coupled to selected ones of the field devices to receive real time data from the field devices, the real time data formatted according to a communications protocol associated with the field devices, the communications gateway converting the received real time data to standardized real time data in a standard data format independent of the field devices that specifies for each item of real time data a content and source of the real time data;

a plurality of application cells, each application cell coupled to the communications gateway to receive the standardized real time data for at least one of the field devices and apply an inferencing operation thereto to produce derived real time data;

an object server communicatively coupled to the plurality of application cells to receive the derived real time data and to store the derived real time data in a plurality of data objects, each data object having attributes corresponding to attributes of a field device; and a personal agent framework including:

at least one personal agent, each personal agent receiving the derived real time data from the object server, each personal agent including at least one presentation cell, each presentation cell providing a representation of at least one attribute of a field device that is dynamically responsive to real time changes in the attribute, each presentation cell receiving the derived real time data for the attribute, and mapping the derived real time data to an output representation.

4. The system of claim 3, wherein the virtual application service is executed on a host computer system; and the personal agent framework is executed on at least one client device.

5. The system of claim 4, wherein the personal agent framework further comprises:

at least one service agent representing an instance of virtual application services, each service agent communicatively coupled to the object server of the virtual application service to receive derived real time data of a data object in response to the data object being updated by an application cell.

6. The system of claim 3, wherein the at least one personal agent can be customized by a user by selecting a type of presentation cell to be included in the at least one personal agent.

7. In a supervisory control and data acquisition system for managing distributed field devices that control or monitor physical or logical entities, the field devices having attributes representative of states of the entities, the system comprising at least one personal agent that receives real time data corresponding to the attributes and maps the real time data to an output representation, a computer-implemented method for customizing the at least one personal agent, the method comprising:

associating the personal agent with a service agent, wherein the service agent is communicatively coupled to an object server to receive the real time data of one of a plurality of data objects in response to the data object being updated; and the object server is configured to receive the real time data from the field devices and to store the real time data in the plurality of data objects, each data object having attributes corresponding to attributes of a field device;

creating at least one presentation cell to provide a representation of at least one attribute of a field device that is dynamically responsive to real time changes in the attribute, the at least one presentation cell receiving the real time data for the attribute, and to map the real time data to an output representation; and associating the at least one presentation cell with a data object in the service agent.

8. The method of claim 7 further comprising:

configuring properties of the service agent by receiving a user input specifying at least one of the following:

a name of the service agent;

a name of the object server which is communicatively coupled with the service agent;

a type of data contained in the object server;

a length of each data object in the object server; and an address of a host computer on which the object server is located.

9. The method of claim 7, further comprising:

configuring properties of the at least one presentation cell by receiving a user input specifying at least one of the following:

a display attribute of the at least one presentation cell;

an editing attribute of the at least one presentation cell;

a name of the at least one presentation cell;

the attribute of a field device that the at least one presentation cell represents; and a range of values for which the at least one presentation cell maps inputs to outputs.

10. A computer program product stored in a computer readable medium for controlling a computer to perform a method for publishing supervisory and control data for managing distributed field devices that control or monitor physical or logical entities, the field devices having attributes representative of states of the entities, the method comprising:

receiving from the distributed field devices real time data formatted according to a communications protocol associated with each field device, such that real time data received from at least two field devices has different data formats;

converting the received real time data to standardized real time data in a standard data format independent of the field devices that specifies for each item of real time data a content and source of the real time data;

processing the standardized real time data to produce derived real time data;

storing in a central host computer the derived real time data in individual data objects in an object server, each data object having attributes corresponding to attributes of a field device; and publishing the derived real time data for the attributes of each data object to allow software processes executing on computers remote from the host computer to access the derived real time data.

11. A computer implemented method for providing supervisory and control data for managing distributed field devices that control or monitor physical or logical entities, the field devices having attributes representative of states of the entities, the method comprising:

on a host system:

receiving from the distributed field devices real time data formatted according to a communications protocol associated with each field device, such that real time data received from at least two field devices has different data formats;

converting the received real time data to standardized real time data in a standard data format independent of the field devices that specifies for each item of real time data a content and source of the real time data;

processing the standardized real time data to produce derived real time data;

storing in a central host computer the derived real time data in individual data objects in an object server, each data object having attributes corresponding to attributes of a field device;

publishing the derived real time data for the attributes of each data object to allow software processes executing on computers remote from the host computer to access the derived real time data;

on a client device:

subscribing to the derived real time data for the attributes of each data object;

receiving the derived real time data;

representing the derived real time data on presentation cells; and responsive to a change in the published derived real time data, dynamically updating a representation of the change in the attributes of the field device by mapping the derived real time data to an output representation on a presentation cell.

12. A computer implemented method for providing supervisory and control data for, managing distributed field devices that control or monitor physical or logical entities, the field devices having attributes representative of states of the entities, the method comprising:

on a first host system:

receiving from the distributed field devices real time data formatted according to a communications protocol associated with each field device, such that real time data received from at least two field devices has different data formats;

converting the received real time data to standardized real time data in a standard data format independent of the field devices that specifies for each item of real time data a content and source of the real time data;

processing the standardized real time data to produce derived real time data;

storing in a central host computer the derived real time data in individual data objects in an object server, each data object having attributes corresponding to attributes of a field device;

publishing the derived real time data for the attributes of each data object to allow software processes executing on computers remote from the first host computer to access the derived real time data;

on a second host system:

subscribing to first host system to obtain the derived real time data for the attributes of at least one of the data objects;

receiving from the first host system the derived real time data of a subscribed data object;

publishing the derived real time data for the attributes of the subscribed data object to allow software processes executing on computers remote from the second host computer to access the derived real time data;

on a client device:

subscribing to the second host system to obtain derived real time data for the attributes of at least one of the data objects;

receiving from the second host system the derived real time data;

representing the derived real time data on at least one presentation cell on the client device; and responsive to a change in the published derived real time data, dynamically updating a representation of the change in the attributes of the field device by mapping the derived real time data to an output representation on a presentation cell.

* * * * *